US012724802B1

(12) United States Patent
Nanu et al.

(10) Patent No.: US 12,724,802 B1
(45) Date of Patent: Sep. 1, 2026

(54) GENERATIVE AI-BASED TARGETED DYNAMIC DATA ACQUISITION AND PROCESSING FOR STRUCTURED OUTPUT GENERATION

(71) Applicant: Prompt Therapy Solutions, Inc., Hoboken, NJ (US)

(72) Inventors: Roshan Nanu, Hoboken, NJ (US); Adam Baliatico, Hoboken, NJ (US)

(73) Assignee: Prompt Therapy Solutions, Inc., Hoboken, NJ (US)

( * ) Notice: Subject to any disclaimer, the term of this patent is extended or adjusted under 35 U.S.C. 154(b) by 0 days.

(21) Appl. No.: 19/642,361

(22) Filed: Apr. 8, 2026

Related U.S. Application Data

(60) Provisional application No. 63/786,490, filed on Apr. 10, 2025.

(51) Int. Cl.
*G06F 16/3329* (2025.01)
*G06F 3/0481* (2022.01)

(52) U.S. Cl.
CPC ........ *G06F 16/3329* (2019.01); *G06F 3/0481* (2013.01)

(58) Field of Classification Search
CPC ........................... G06F 16/3329; G06F 3/0481
See application file for complete search history.

(56) References Cited

U.S. PATENT DOCUMENTS

| | | | | |
|---|---|---|---|---|
| 11,404,145 | B2 * | 8/2022 | Saripalli | G06N 3/091 |
| 2010/0324936 | A1 * | 12/2010 | Vishnubhatla | G06Q 40/08 715/810 |
| 2023/0215577 | A1 * | 7/2023 | Molero Leon | G16H 10/20 705/2 |
| 2026/0038699 | A1 * | 2/2026 | Shreshtha | G16H 50/70 |
| 2026/0079924 | A1 * | 3/2026 | Dande | G06F 16/243 |

FOREIGN PATENT DOCUMENTS

| | | | | |
|---|---|---|---|---|
| EP | 4687147 | A1 * | 2/2026 | G16H 10/60 |
| WO | WO-2022261244 | A1 * | 12/2022 | H04L 9/40 |

* cited by examiner

*Primary Examiner* — Kuen S Lu
(74) *Attorney, Agent, or Firm* — Mughal Gaudry & Franklin PC

(57) ABSTRACT

The present disclosure relates to techniques generating real-time intelligent datasets by leveraging generative artificial intelligence (AI) models based on input data provided by a subject. The generation may involve generating a set of functional limitations to identify areas, potentially affected by the condition. The generated adaptive dataset may be availed to the subject, via a interaction interface, to receive corresponding user input signals. In some aspects, datasets may be further employed by an AI engine that processes multiple inputs, including the input data, evaluation dataset, and corresponding subject input signals to generate a customized structured output comprising one or more outputs. The AI engine may be configurable to generate these outputs either in a structured format (e.g., a list) or as a structured free-text summary, presented in a natural language format. The disclosed techniques may be applied across domains, including medical industry, law, employment and equipment maintenance.

20 Claims, 7 Drawing Sheets

Artificial Intelligence (AI) Engine 502

Input Data

102

Functional Limitations

118b

126

128

Database 504

Prediction Models 518

Natural Language Processing Techniques 520

Recommendation System 522

Generative Artificial Intelligence Model 524a

Generative Artificial Intelligence Models 524n

User Narrative Report

506

History of Current Condition

508

Relevant Influencing Factors

510

Prior State

512

Current State

514

Recommendations

516

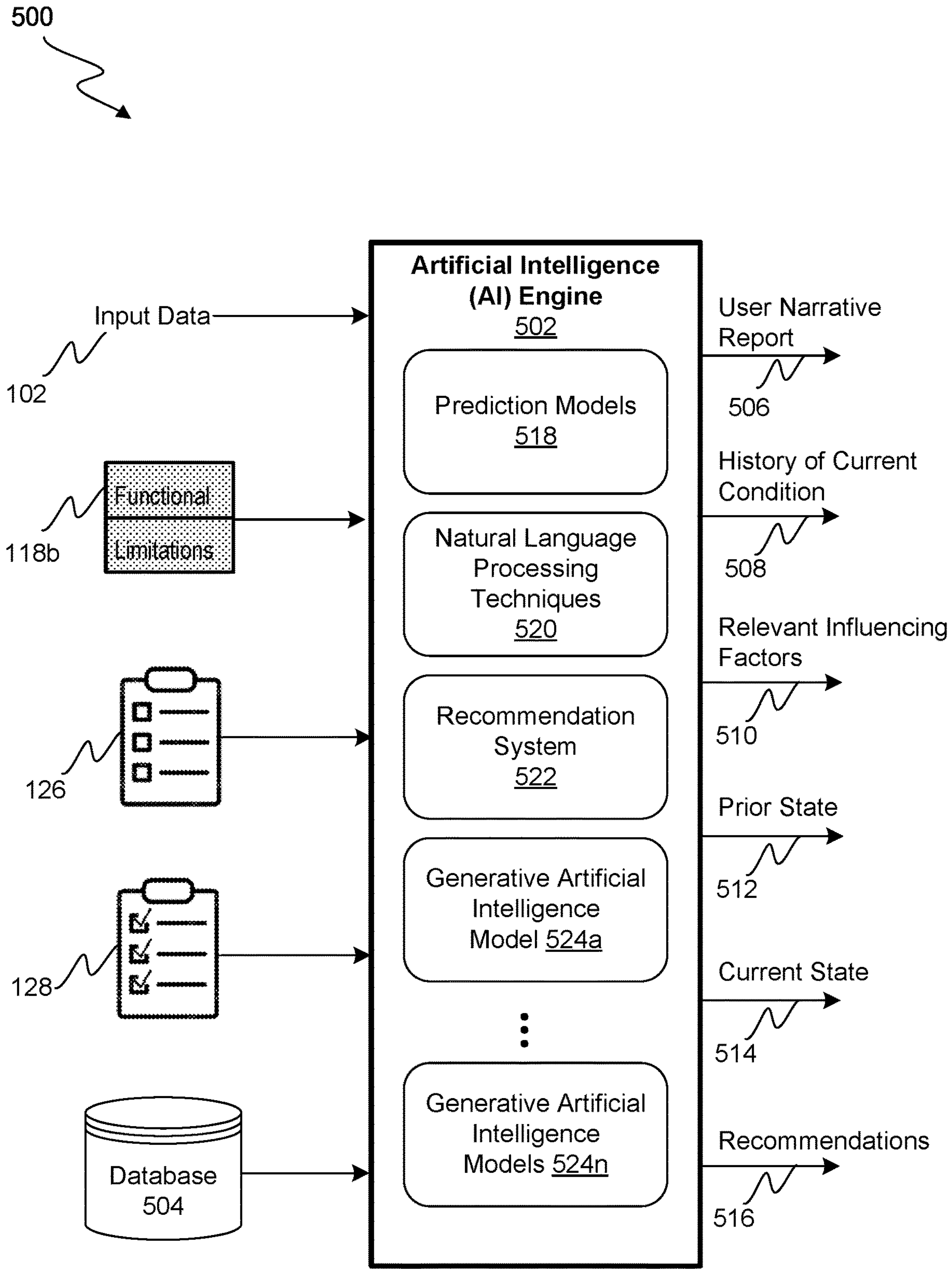

*FIG. 5*

Receive input data comprising subject demographics and subject-context information that includes a description of a condition and associated historical data of a subject — 602

Generate, based on the input data, a set of functional limitations that are affected by the condition by leveraging one or more machine-learning techniques that are configured to extract contextual elements by processing the input data — 604

Avail the set of functional limitations to the subject via an interaction interface that includes one or more interactive components associated with a functional limitation, configured to receive one or more responses that correspond to the functional limitation — 606

Extract a subset of functional limitations from the set of functional limitations based on the one or more input signals associated with the functional limitation of the set of functional limitations — 608

Generate, based on the subset of functional limitations, dynamically adaptive evaluation datasets comprising a set of evaluation instances that are relevant to the input data and a set of input parameters associated with each evaluation instance of the set of evaluation instances — 610

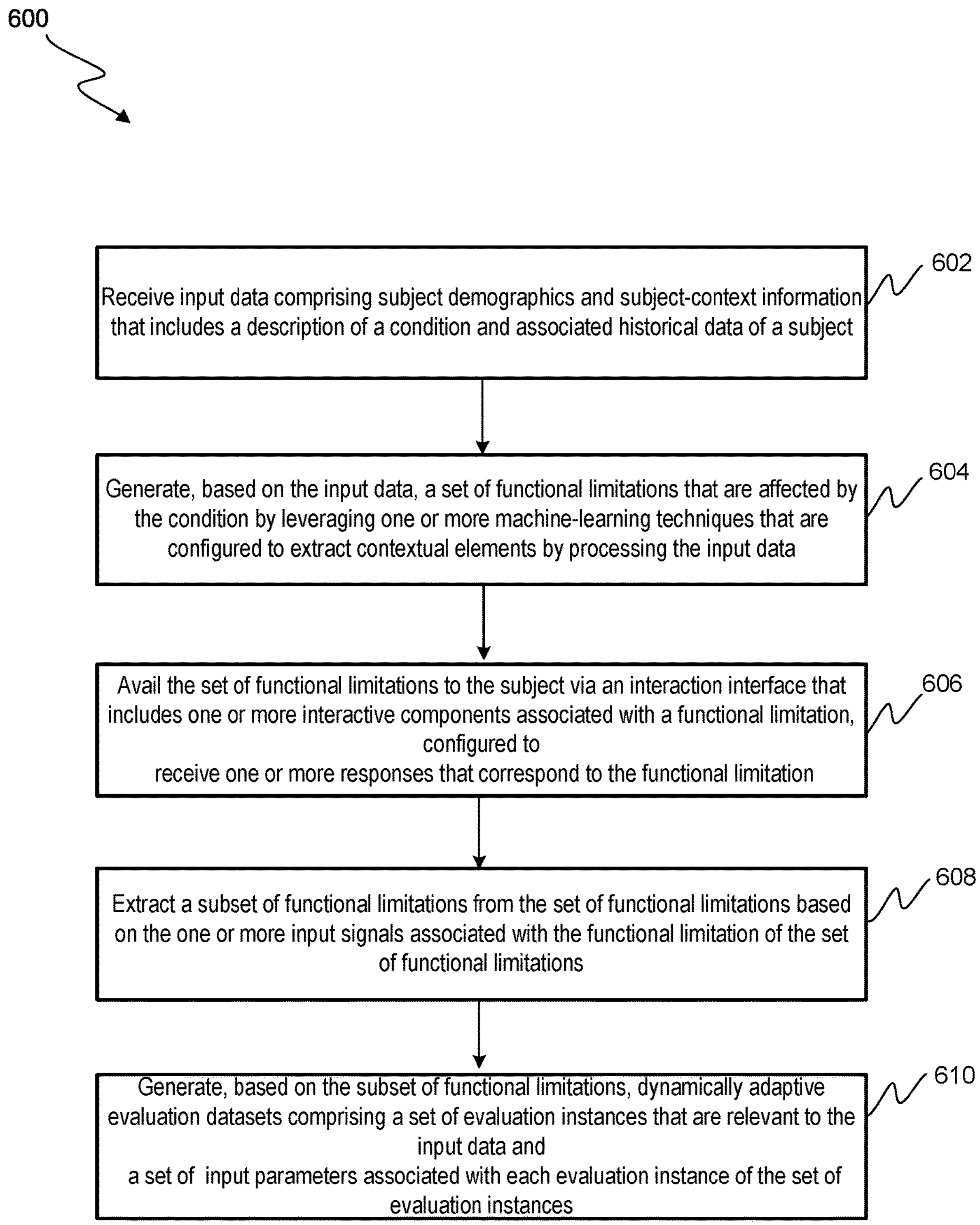

*FIG. 6*

GENERATIVE AI-BASED TARGETED DYNAMIC DATA ACQUISITION AND PROCESSING FOR STRUCTURED OUTPUT GENERATION

CROSS-REFERENCE TO RELATED APPLICATIONS

This application claims the benefit of U.S. Provisional Patent Application No. 63/786,490, filed on Apr. 10, 2025, titled "Real-Time Intelligent Assessments and Customizable Report Generation Using Generative Artificial Intelligence". The entire disclosure of the aforementioned application is incorporated by reference herein in its entirety for all purposes.

BACKGROUND

Traditional assessments for performing analysis, conducting assessments, or collecting feedback in various fields such as healthcare, legal services, and employment are often lengthy and generalized. For instance, in healthcare, patient intake forms typically cover a wide range of conditions, many of which may not be relevant to current symptoms or situation of a patient. Similarly, in rule-based processing systems and employment contexts, assessments such as client reports or performance analysis are often generalized and fail to capture specific factors that are directly relevant to an individual's case or performance. This lack of focus may make the process inefficient and ineffective, leading to incomplete or inaccurate responses from individuals. Specifically, in healthcare, lengthy assessments can overwhelm patients, discouraging them from providing necessary information, which may hinder the creation of accurate patient profiles and personalized treatment plans.

Additionally, report generation processes following these assessments often fail to include contextual information, such as before-and-after state of a problem, medical history, or other relevant background details due to lack of relevant information. Without these elements, reports may tend to be overly generalized or incomplete, making it difficult to accurately assess the current condition, needs, or progress of an individual. For example, in healthcare, neglecting to incorporate a subject's medical history or symptom progression may lead to poorly tailored care plans. Similarly, overlooking prior performance or case history could result in misguided recommendations or decisions.

Furthermore, during the collection of information for processing or output generation for performing downstream or upstream tasks using machine-learning models, privacy may become a concern. As these models rely on large datasets for accurate outputs, there is a risk that sensitive personal data, including personal identifiable information (PII), may be exposed or misused if not properly managed. Using data without removing PII can introduce unintended biases, as the inclusion of identifiable information could inadvertently influence the model's decision-making process, leading to unfair or skewed results. This can undermine the integrity of the model by causing it to make predictions based on irrelevant or sensitive data, making it difficult to enable privacy, fairness, and accuracy throughout the process.

SUMMARY

Certain aspects of the present disclosure relate to real-time intelligent data-driven computational output and adaptive structured output generation by leveraging generative artificial intelligence (AI) models based on input data. Intelligent data-driven computational output (interchangeably used herein with evaluation datasets, datasets and personalized evaluation datasets) may refer to evaluation instances or queries that are personalized, tailored, or dynamically generated with respect to the input data provided by the user or subject, such that only targeted and applicable questions are posed, thereby reducing the time required for completing the dataset. The real-time intelligent data-driven computational output may be further employed along with the input data to generate a configurable documentation or structured output for a provider platform (e.g., a medical facility, a firm, an organization or other businesses) associated with a specific application domain e.g., healthcare, legal, employment, or equipment maintenance (e.g., for condition dataset and reporting). In some aspects, the disclosed techniques may include receiving the input data that may comprise subject demographics (e.g., age, gender, and socioeconomic status) and subject-context information. The subject-context information may include a description of a problem (e.g., medical condition or injury or a contract disagreement) and associated historical data (e.g., symptoms, prior treatment, past experiences, or negotiations) depending upon the specific application domain.

Based on the input data, a set of functional limitations may be generated using one or more machine-learning techniques, particularly including natural language processing (NLP) and generative AI models, to identify areas (or activities) potentially affected by the problem. NLP techniques such as platform recognition, keyword extraction, and semantic analysis may be used to extract contextual elements (features), while a first generative AI model may generate the set of functional limitations based on these features. For example, in the clinical data processing system, contextual elements extracted from the input data may include e.g., "male", "laborer", "suffering a knee injury", where functional limitations may involve home activities (e.g., cleaning, climbing stairs) and/or work activities (e.g., lifting a heavy load, prolonged standing).

In some examples, the generated set of functional limitations may be availed to the subject via an interaction interface for selecting a subset of functional limitations that are most applicable to the problem or condition. To enable user selection, the interaction interface may include one or more interactive components (e.g., checkboxes) associated with a functional limitation of the set of functional limitations. These components may be configured to receive one or more input signals (e.g., selections) from the subject with respect to the functional limitation. The subset of functional limitations from the set of functional limitations may be extracted from the input signals by analyzing the user selections e.g., through parsing or matching techniques. Based on the subset of functional limitations, adaptive datasets may be dynamically generated, comprising a plurality of evaluation instances specifically tailored to the extracted functional limitations and the input data. Each evaluation instance may include a set of input parameters (or options) for the subject to select from. Additionally, each evaluation instance may include one or more quantifiable metrices (e.g., a distance covered by a subject with knee injury without experiencing pain) to quantitatively assess the subset of functional limitations. These adaptive datasets may be generated using a second generative AI model of the one or more machine-learning techniques such that the evaluation instances (interchangeably used as evaluation instances) are applicable and contextually aligned with the input data and extracted function limitations. The quantifiable metrices can be interchangeably termed as quantifiable parameters.

Once the adaptive datasets are generated, these may be availed to the subject through the interaction interface that may include two sets of interactive components for each evaluation instance. The first set of interactive components may be configured to receive a first input signal corresponding to a prior state of the subject, reflecting a condition or an ability before the onset of the problem. The second set of components may be configured to capture a second input signal that corresponds to a current state of the subject, reflecting the condition or ability after the onset of the condition. This dual-set structure may help in gathering a clear comparison of the before and after functional abilities of the subject, which helps generate more accurate and context-specific report, enabling better decision-making tailored to the subject objectives or goals.

In some aspects of the present disclosure, for each evaluation instance, the first and second input signal may be determined via an AI engine to analyze these input signals. The AI engine may process multiple inputs e.g., the input data, adaptive datasets and user input signals including the subset of functional limitations, and the first and second input signals associated with each evaluation instance. The AI engine may process these inputs by leveraging the one or more machine-learning techniques including NLP, recommendation models, one or more (fine-tuned) generative AI models, and prediction models to generate a domain-specific structured output or report that includes one or more configurable sections. Each section may further comprise one or more outputs that may be generated or adapted in accordance with the specific application domain or a preference of the provider platform such as law firm or healthcare facility. The AI engine may be configurable to generate these outputs either in a structured format (e.g., a list or a table) or as a structured free-text summary, presented in a clear and coherent natural language format. For example, the AI engine may leverage a large language model to generate a subjective section comprising a subject narrative description in the natural language format capturing self-reported details from the input data and the user input signals.

In some examples, the subjective section may include a longitudinal record in the natural language format detailing the prior state of the subject, prior interventions (e.g., prior treatments) or past experiences applicable to the condition as reported by the subject. Additionally, the subjective section may comprise one or more applicable influence factors (e.g., co-morbidities, frequent work leaves, or prior lawsuits) that currently are, or will be impacting the current state of the subject at a predefined time (e.g., in months or years). The AI engine may access a database for retrieving historical records (e.g., medical reports, prior performance logs, prior criminal records) of the subject to generate these influencing factors. In some other examples, the AI engine may compare and determine the subject input signals to identify both the prior condition (before the onset of the condition) and the current condition (after the onset of the condition). It may then generate an assessment section in the natural language format comprising both the prior and current states with respect to the one or more quantifiable metrices that are applicable to the functional limitations.

Additionally, the evaluation section may include one or more scores derived from predefined functional limitation reporting (FLR) surveys and/or from the input signals to adaptive evaluation, thereby determining a potential for score improvement. Similarly, a recommendation section may include recommendations for appropriate actions, interventions, long-term goals or next steps based on applicable data e.g., the identified functional limitations, prior state and current state. The long-term goals may represent measurable objectives driven by a subset of functional limitations, as well as the input signals from the adaptive datasets or adaptive datasets, enabling alignment with applicable regulatory or industry standards.

In some aspects, the one or more machine-learning techniques may be trained on a dataset of a plurality of subjects, where the input data associated with each training sample (or subject) is transformed. This transformation is configured to remove personal identification information (PII) that includes sensitive details such as names, addresses, or contact information. To enable compliance with established data privacy and usability standards, such as the General Data Protection Regulation (GDPR), data de-identification may be applied to transform the input data. The data de-identification may involve replacing any identity-related information with synthetic data such that the anonymity of the subject is maintained. The data de-identification may include extracting a set of data instances associated with the personal identification information from the input data. The (raw) input data, including subject demographics and subject-context information, may comprise structured text (e.g., from database, or defined structured fields such as names or phone numbers) and unstructured text (e.g., free-text problem description, emails, or logs).

Based on these text formats, the set of data instances may be extracted by employing various techniques e.g., for structured text, data instances may be directly retrieved from well-defined fields in the input data. In some instances, pattern-based data instances with known formats or patterns (e.g., including emails, structured dates, URLs (universal resource allocator), IP addresses, social security number (SSNs)) associated with personal information identifiers may be identified from structured and unstructured text by e.g., regular expressions (regex), machine-learning models, and rule-based systems. Additionally, other data instances may be extracted from the input data using the one or more machine-learning techniques including named entity recognition (NER) techniques, which may be configured to identify personal information identifiers such as unstructured time and dates, organization names, political or religious group names, places and other sensitive instances within unstructured text.

Subsequent to extraction of data instances, classification may be performed to group similar data instances into predefined categories (or data instance types e.g., names, emails). For each data instance, a structured identifier may be generated that may uniquely identify each extracted data instance. Each structured identifier may include a token that corresponds to the data instance type and an additional identifier for an associated data instance value. The data de-identification may further include data instance replacement and identifier replacement, swapping out the original values of extracted data instances with either synthetic values (resulting in synthetic data) or identifiers (resulting in redacted data). For instance, if an extracted data instance associated with personal information identifiers or referring identifiers is, "Jane Doe," the redacted data may comprise [FIRST_NAME_abc123], while the synthetic data may comprise, "Lily Smith". The synthetic data may be generated by applying a third generative AI model of the one or more machine-learning techniques that may be configured to replace the unique structured identifier associated with each data instance with a synthetic value. The synthetic data may be incorporated into the input data to generate the transformed data. The transformed data and the raw input data may be submitted to a third party for the review to verify whether the generated synthetic data complies with predefined usability and privacy criteria.

In some aspects, for each generative AI model of the one or more machine-learning techniques, a prompt may be generated manually by a human expert. Alternatively, the prompt may be crafted by dynamically populating a prompt-template with contextual elements extracted from the provided input to the generated AI model. The prompt may include specific instructions or intents (e.g., "generate five datasets," "generate tasks") and designated fields from the input. For example, to generate the set of functional limitations, the prompt-template may be populated with contextual elements (e.g., "[intent] for a [gender] working as [role] with [age] and [condition]"). Once populated, the prompt may be provided as input to the first generative AI model, which processes the prompt and generates the corresponding set of functional limitations.

Additionally, one or more input guardrails may be applied to an input (e.g., prompt) and one or more output guardrails may be applied to an output (e.g., generated input signal) of each generative AI model of the one or more machine-learning techniques. In some aspects, the prompt provided to the generative AI model is generated from an optimized prompt-template that has been modified using a training dataset comprising labeled input-output pairs to improve output accuracy. The optimization may include algorithmic modification of instruction sequences, reordering of prompt components, and/or inclusion of representative instances derived from de-identified training data. These guardrails may validate whether the inputs and outputs conform to predetermined linguistic structures (e.g., sentence structure, grammar, punctuation), safety protocols and regulations. In some examples, the one or more input guardrails may verify that the input to each generative AI model is free from adversarial prompts (or prompt injections), which may cause the output to deviate from the intended task. Additionally, the input guardrails and output guardrails may employ fuzzy matching techniques to detect and filter out offensive or inappropriate language (e.g., profanities) in both input prompts and generated input signals. For instance, fuzzy matching techniques may be employed to recognize "b@d" as a variation of "bad" and automatically correct it for consistency in interpretation.

The one or more output guardrails may include a prompted call to a generative AI model e.g., a large language model of the one or more machine-learning techniques to verify that the output of each generative AI is refined from a set of moderation categories. These moderation categories may be predefined including at least one of child abuse, hate speech, malware, physical or economic harm, fraud, adult content, and/or unqualified law, health, or financial advice. If, for example, a generated input signal is classified under these moderation categories (restricted categories), the input signal may be rejected. It should be understood that the first, second and third generative AI models of the one or more machine-learning techniques responsible for generating functional limitations, adaptive datasets and synthetic data, respectively, may either be the same model or different models, depending on the generation process and the complexity of the underlying data.

In some aspects of the present disclosure, missing information from the input data may be filled pseudo-randomly based on probabilistic models that derive information from the subject demographics, such as occupation, marital status, and age. These models may estimate a likelihood of a category (e.g., occupation) based on known population distributions or trends. For instance, Bayesian models may be used to estimate the probability of an individual being "employed" or "retired" based on prior knowledge of how age or gender typically correlates with these categories in the population. In other examples, statistical techniques may be applied for data imputation, such as filling missing values with the mean, median, or mode of the available data.

In certain examples, a training dataset derived from the transformed data or the input data prior to training of the one or more machine-learning techniques may be cleaned for removing inconsistencies, e.g., by defining a uniform rule for consistent values (e.g., converting "M" and "F" into "Male" and "Female"), alternatively, by removing them. Similarly, certain values from the training dataset may fall outside the expected range or may not match the predefined criteria, for example, including alphabets in phone numbers. Such errors may be detected by applying validation rules that check expected formats and may then correct or flag them for review. In some examples, data cleaning may involve removing or merging duplicates by comparing all examples of the training dataset based on specific identifier (e.g., email or any identification number). Upon identification of duplicates, the redundant values may be removed or merged (e.g., by being replaced by an average or by retaining the most recent record based on a timestamp).

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product tangibly embodied in a non-transitory machine-readable storage medium, including instructions configured to cause one or more data processors to perform part or all of one or more methods or processes disclosed herein.

In some embodiments, a system is provided that includes one or more means to perform part or all of one or more methods or processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The present disclosure is described in conjunction with the appended figures:

FIG. 5 illustrates an exemplary network of adaptive report generation in accordance with some aspects of the present disclosure.

FIG. 6 illustrates an exemplary workflow of the generation of adaptive datasets in accordance with certain aspects of the present disclosure.

DETAILED DESCRIPTION

Figure 1:
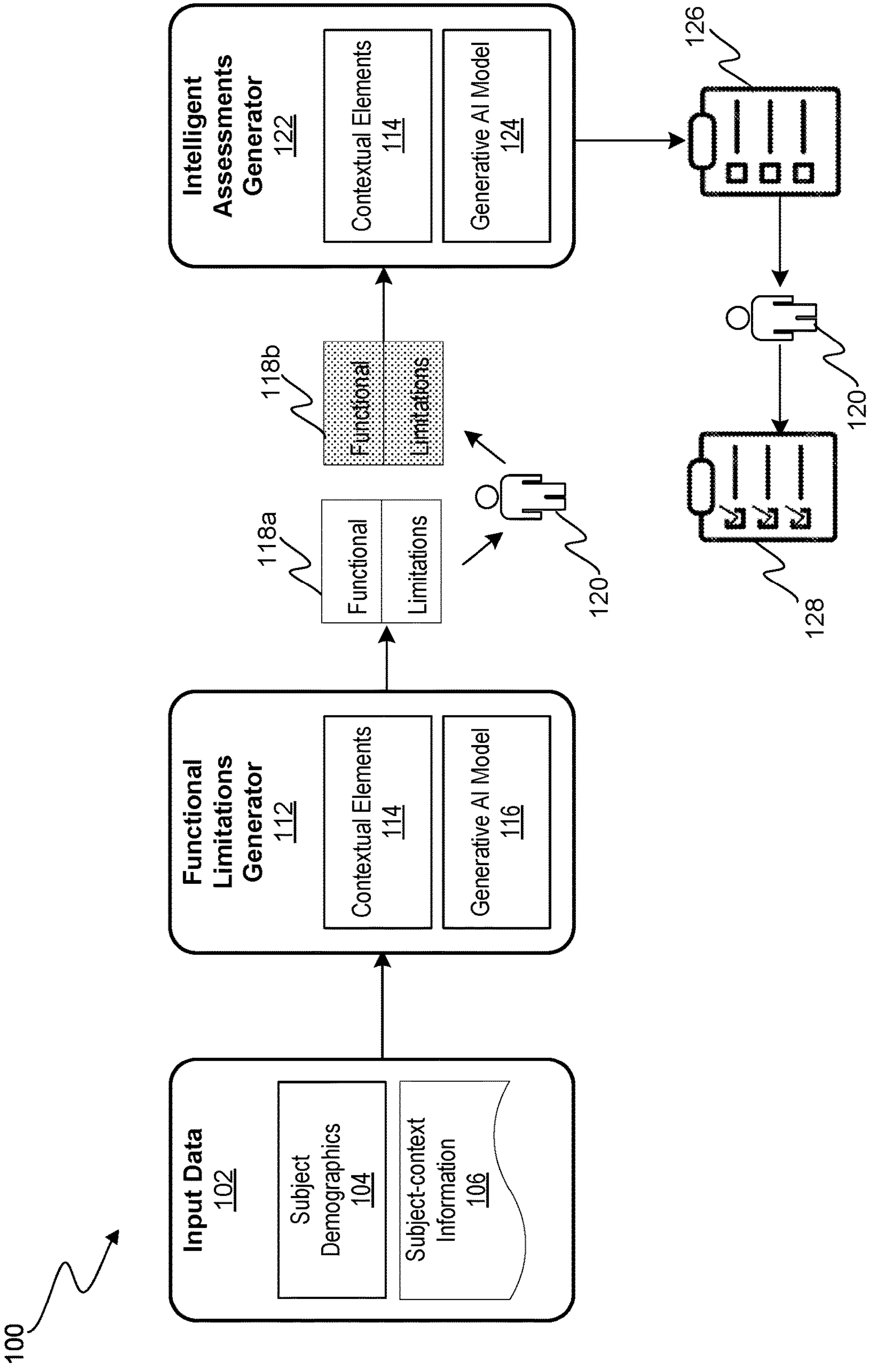
FIG. 1 illustrates a block diagram for generation of adaptive datasets in accordance with some aspects of the present disclosure.

Some embodiments of the present disclosure relate to techniques for generating real-time intelligent datasets by leveraging generative artificial intelligence (AI) models based on input data provided by a user or a subject. The intelligent datasets may enable processing systems (e.g., clinical data processing systems, rule-based processing systems, or organisation) to make informed decisions, generate structured and adaptive objective outputs, and formulate long-term computational models or strategies. For instance, in healthcare, intelligent datasets may help enhance a likelihood of payer approval by aligning treatment plans with specific criteria, while in legal contexts, these datasets can aid in drafting accurate and applicable recommendations, case summaries, or reports tailored to the specifics of the case. The input data may comprise subject demographics and subject-context information that may include a narration of a problem (e.g., a medical condition or an injury, a legal matter, or an injury claim) and associated historical data (e.g., onset date, prior experiences or treatments, and negotiations), depending on a specific application domain. The subject demographics may include, but are not limited to, age, gender, date of birth, occupation, socioeconomic status, education, and/or location.

The input data related to the subject may comprise personal identification information (PII) that refers to any data instance or data element that may be used to identify an individual. The PII may include, but are not limited to, social security numbers (SSNs), phone numbers, addresses, IP (internet protocol) addresses and/or medical record (or record numbers). Based on the structured or unstructured text of the input data, applicable data instances associated with PII may be extracted using a range of techniques, including direct extraction from structured data fields, pattern-based methods (e.g., regular expressions) that identify specific formats (e.g., email addresses), and natural language processing (NLP) techniques, such as instance recognition to particularly extract data instances from unstructured text.

For compliance with data privacy and usability standards, data de-identification may be applied to the input data during training, resulting in transformed data. The transformed data may be generated by replacing data instances associated with personal information identifiers with structured identifiers (representing redacted data) that may uniquely determine each data instance, which may then be substituted with synthetic values (representing synthetic data) generated by a generative AI model, thereby preserving the anonymity of the subject. In some aspects, transformed data may be validated for compliance with privacy, including industry regulations such as HIPAA (Health Insurance Portability and Accountability Act), or GDPR (General Data Protection Regulation), by submitting both the transformed and (raw) input data to a third party for expert review and certification. If the data fails privacy checks, it may be sent back for re-processing with enhanced anonymization techniques. In some examples, prior to or after the validation, the transformed data (or input data) may undergo preprocessing, which may include operations such as data imputation (e.g., filling in missing values) and data cleaning (e.g., correcting linguistic issues, removing inconsistencies or duplicates).

In some aspects of the present disclosure, for performing a task with a generative AI model, a prompt may be crafted. The prompt may comprise an intent of performing an action (e.g., "generate functional limitations", "generate five adaptive datasets", or "generate a compact summary") and additional contextual elements. The prompt may be crafted manually by a human expert or, alternatively, generated dynamically by populating a prompt-template with contextual elements. These contextual elements may be extracted from the input that may vary depending upon the task of the generative AI model. One or more machine-learning techniques, particularly including NLP techniques such as entity or instance recognition, keyword extraction, and semantic analysis may be used to parse and extract these contextual elements. The extracted contextual elements may be utilized to craft the prompt for the generative AI model. In some aspects, one or more input guardrails may be applied to the crafted prompt for validating prompt adherence to linguistic structures, removing any harmful content (e.g., profanities), avoiding prompt injection that may cause the generation of unintended content. Once the prompt is validated, it may be fed to the generate AI model. Similarly, one or more output guardrails may be applied to the generated input signals of the generative AI models to validate that the output is free of any moderation categories (or restricted categories e.g., including politics, fraud, hate or violence).

The generation of intelligent datasets (or interchangeably used herein with adaptive datasets) may involve generating a set of functional limitations to determine or narrow down areas (or activities) that are potentially affected by the problem. The set of functional limitations may be generated by first extracting the contextual elements from the input data, and then by crafting the prompt based on these contextual elements. In some aspects, the prompt is generated using an optimized prompt-template, wherein the prompt-template is pre-processed using supervised learning techniques on a labeled dataset to modify prompt structure, including instruction sequences (i.e., an ordered arrangement of instructions or directives within the prompt that guides the generative AI model's reasoning process), parameter ordering (i.e., a structured arrangement of input variables or contextual elements within the prompt to control their relative importance and interpretation), and inclusion of representative instances (i.e., incorporation of example input-output pairs or sample cases within the prompt to condition the model toward desired outputs), to improve performance of the generative AI model. The prompt may then be validated through input guardrails before being fed into a first generative AI model, which generates a set of functional limitations. The generated set of functional limitations may be availed to the subject, via an interaction interface, to select applicable functional limitations that correspond to the condition. To generate adaptive datasets, contextual elements may be extracted from the selected functional limitations and the input (or transformed) data to craft a second prompt. The second prompt may also be generated using a similarly optimized prompt-template that is refined using training data to improve contextual alignment and output consistency. After validating the second prompt, it may be input into a second generative AI model, which produces adaptive datasets. The adaptive dataset may comprise applicable evaluation instances that are contextually aligned with the input data and the selected functional limitations. In some aspects, the first and second generative AI models may be instances of the same underlying model, while in other examples, these may correspond to distinct generative AI models.

Each evaluation instance may include one or more quantifiable metrices and a set of input parameters (or options) for the subject to select from. The quantifiable metrices may be leveraged to objectively assess the selected functional limitations e.g., to assess a severity of condition or delays. The set of input parameters or options are dynamically created to align with the condition being addressed, enabling their relevance and applicability to the specific evaluation instance. These adaptive or personalized datasets may be presented to the subject via the interaction interface to receive corresponding subject input signals with respect to a prior and/or current state before and after an onset of the condition. The generated personalized datasets may be availed to the subject through the interaction interface that may include two sets of components for each evaluation instance. The first set of components may be configured to receive a first input signal corresponding to a prior state of the subject (or the condition), reflecting a condition or an ability before the onset of the condition. The second set of components may be configured to capture a second input signal that corresponds to the current state of the subject (or the condition), reflecting the condition or ability after the onset of the condition. This dual-set structure may help in gathering a clear comparison of the before and after functional abilities or limitations associated with the condition or the subject. The comparison may help generate more accurate and context-specific report, enabling better decision-making tailored to the subject objectives or goals. For each evaluation instance, the first and second input signal may be determined via an AI engine to analyze these input signals.

In some aspects of the present disclosure, an AI engine may process multiple inputs including the input data, applicable functional limitations, personalized datasets, and corresponding subject input signals to generate a structured provider document or report. The provider document may comprise various customizable sections including one or more outputs, which may be generated or adapted in accordance with a given application domain or a preference of the provider such as a law firm or a healthcare facility. The AI engine may be configurable to generate these outputs either in a structured format (e.g., a list or a table) or as a structured free-text summary, presented in a clear and coherent natural language format. For example, the provider document may comprise a subjective section including brief summaries of subject-reported data in a natural language format e.g., narrating condition, history, and influencing factors (e.g., co-morbidities, frequent work leaves, or prior lawsuits) that currently are or will be impacting on the current state of the subject (or the condition) at a predefined time (e.g., in months or years). These summaries or text may be generated via one or more large language models (LLMs).

Similarly, the provider document may be adapted to include an dataset section comprising an dataset of functional aspects for the prior and current state with respect to quantifiable metrices. The prior and current states reflect a condition or situation before and after the onset of the condition, respectively, derived from a combination of subject-reported data (e.g., input data and the input signals to the personalized datasets), and historical records that may be accessed from a database. These datasets may determine how the issue has impacted the individual, system, or process, comparing the current state to the prior state to determine any changes or impairments.

In some examples, other domain-specific datasets may be generated using generative AI models to further determine the current state of the subject. For example, in healthcare, these datasets may include pain determination using standardized scales (e.g., numerical pain ratings or categorical descriptors such as "mild" to "severe") and functional limitation reporting (FLR) survey scores. These scores may be based on predefined surveys, such as the KOOS for knee issues or the ODI for lower back conditions, or from the input signals of the personalized datasets. Additionally, these datasets determine potential for improvement, helping to predict recovery progress and inform targeted treatment plans by considering both current functional status and projected improvements.

Additionally, the provider documentation may include a recommendation section offering tailored suggestions for actions, interventions, and long-term goals based on applicable data e.g., functional limitations, prior and current states. In healthcare, recommendations can involve specific treatments, selected from predefined lists or templates, and generated using a hybrid recommendation system that combines large language models (LLMs) with traditional machine-learning methods. This system may suggest treatments, range of motion measurements, strength tests, and manual muscle testing (MMT) assessments, while also determining if the FLR survey should be completed to track progress. The system is trained on historical data and evidence-based clinical guidelines, enabling both empirical and best-practice-based recommendations. Additionally, it may guide providers on whether to use pain scale questionnaires, dynamically adapting to subject-reported symptoms to improve diagnostic accuracy and treatment planning.

In some examples, the generative AI model may be trained or fine-tuned by applying one or more techniques including e.g., chain-of-thoughts prompting, model distillation and reinforcement learning from human feedback (RLHF). These techniques may enhance the ability of the generative AI model to generate high-quality, contextually accurate input signals. Chain-of-thought prompting may help the model break down complex reasoning tasks by encouraging it to generate intermediate steps or thought processes leading to the final answer. This approach may improve the handling intricate conditions that require multi-step reasoning. Similarly, the fine-tuning/training may incorporate model distillation that transfers knowledge from a large, complex model to a smaller, more efficient model. This technique may enable the smaller model (e.g., the model being fine-tuned) to perform nearly as well as the original larger model, making it more deployable in resource-constrained environments without sacrificing performance. Reinforcement learning from human feedback (RLHF) may further refine the generative AI model by enabling it to learn from human-provided feedback, effectively aligning its input signals with human expectations and improving its understanding of nuances, context, and correctness.

The training/fine-tuning pipeline may employ preprocessing that may involve applying a series of operations to the transformed data or the input data for creating a labeled dataset comprising prompt-input signal pairs. The series of operations may include e.g. data imputation (e.g., completing missing information), data augmentation (e.g., expanding data by generating synthetic but similar examples) and data cleaning (e.g., removing redundancies, duplication and linguistic errors). Subsequently, prompt engineering may be applied to the preprocessed data to craft suitable prompts for the generative AI model. Prompt engineering may include manually drafting the prompts or alternatively automating the process by populating a prompt-template with applicable data or the contextual elements derived from the preprocessed data, similar to the inference pipeline. Once the prompts are crafted, the corresponding input signals may be generated either by domain experts or by automated AI-assisted tools, such as large language models (LLMs). In both variations, the generated prompts and the corresponding input signals are verified by the domain experts for authenticity of the labeled data. The verified labeled data may be further employed by the generative AI model for the fine-tuning.

Real-time intelligent datasets and report generation may be applied across various domains. In some examples, the disclosed techniques may assist in healthcare for conducting patient datasets during a visit for generating intake reports based on the input data provided by the subject, e.g., a subject or a patient. The subject-context information may comprise a description of experiencing a condition including e.g., a medical condition, severity or progression, an injury, affected body part and/or organ and the historical data that is related to the condition (e.g., history of symptoms, prior treatments, onset date). For healthcare, the input data may be leveraged for generating functional limitations to recognize potential daily tasks that are impaired while managing the medical condition. For the generation of functional limitations, the machine-learning techniques e.g., NLP may be configured to extract contextual elements from the input data to craft a prompt for the generative AI model. Once the prompt is crafted it may be validated (e.g., by input guardrails) and then fed to the generative AI model to generate one or more sets of functional limitations (e.g., impaired home activities and work activities). For example, in healthcare, contextual elements extracted from the input data may include attributes such as gender (e.g., "male"), occupation (e.g., "laborer"), and the reported condition (e.g., "suffering from a knee injury"). Based on this information, applicable functional limitations may be determined, such as home activities (e.g., cleaning, climbing stairs) or work-related activities (e.g., lifting heavy loads, prolonged standing).

The generated set of functional limitations may be provided to the subject through a interaction interface for selecting the most applicable limitations. The selected functional limitations may be extracted by analyzing the subject input signals, using techniques such as parsing or matching. Based on the subset, personalized datasets may be dynamically created, comprising tailored evaluation instances based on the selected impaired activities and the input data. Each evaluation instance may include an associated set of options or input parameters, from which the subject can select based on condition or condition. Each evaluation instance may be generated to quantitatively assess the functional abilities of the subject both current and prior to the onset of the condition, with an emphasis on daily and work-related activities. For example, for a subject with a knee injury, an evaluation instance may ask, "How many consecutive holes of golf can you play without pain?" with options such as, "no pain", "1-5 holes," "5-10 holes," or "can't play without pain." In another example, an evaluation instance may ask, "How far can you walk without pain?" with input parameters (or options) such as, "cannot walk without pain," "less than 100 feet," or "up to 0.25 mile". The evaluation instances may be displayed in the interaction interface with two sets of interactive components associated with the set of input parameters, organized into two columns—one for prior ability and one for current ability. These datasets may be intended to support provider instances in developing treatment plans that increase a likelihood of payer approval, creating a detailed and customized objective report, and formulating long-term measurable recovery goals.

In some other examples, the disclosed techniques may assist in legal domain for conducting condition datasets and drafting initial reports (or summarizing cases), based on the input data provided by the subject (e.g., a client). The subject-context information may comprise a description of the condition (e.g., involving an ongoing contract disagreement, land dispute, or injury claim) and the condition-related historical data (e.g., past experiences, prior negotiations, or proceedings). In the domain, this input data may be leveraged to determine applicable limitations, restrictions, and potential impacts based on the situation of the client. For example, in the context of a land dispute, contextual elements such as land ownership type (e.g., "private land" vs. "government land"), restrictions (e.g., "zoning law violations" or "land use permits"), and prior proceedings (e.g., "previous court rulings on land use") may be extracted from the subject-reported input data. These contextual elements may be used to generate a set of limitations or activities impacted by the disagreement, such as restricted land use (e.g., "cannot build on certain areas of the property due to zoning laws"), delays in property sale (e.g., "sale delayed due to zoning disagreement"), restricted development (e.g., "unable to develop land for commercial use due to restrictions"). The subject can then select the most applicable limitations from the set of functional limitations provided.

Once the applicable limitations are selected by the client, adaptive datasets may be dynamically generated, comprising tailored evaluation instances and the associated set of input parameters. Each evaluation instance may be generated to quantitatively assess the impact of the issue on the client's situation, currently and/or prior to the disagreement, with a focus on how it affects their property, business activities, and law proceedings. For instance, in a construction dispute, an evaluation instance may ask: "How many weeks has the construction project been delayed due to zoning disagreements?" with input parameters or options such as, ""no delay", "3-4 weeks," "2-3 months," or "more than a year." In another example, an evaluation instance may ask: "How much of the property was restricted from development due to zoning laws at the time of the disagreement?" with corresponding input parameters such as, "no restriction," "less than 10% of the land," "10-30% of the land," or "more than 30% of the land." These evaluation instances may be tailored to capture both the current and prior state of the issue to provide a dataset. These datasets may assist professionals to better understand the specific impact of the issues on the client's situation. They can use the results to guide rule-based strategies, estimate costs, determine critical delays, and support negotiations or further actions. Ultimately, these tailored limitations help in quantifying the effect of the issue, which can assist in case evaluation, litigation planning, or settlement discussions.

Although various aspects of present disclosure are described with respect to law and medical industry, it will be understood by those skilled in the art that the techniques disclosed herein are not limited to these specific applications. Rather, the techniques and approaches outlined may be equally applicable to any domain that involve datasets and drafting reports such as employment (e.g., assessing employee well-being), and equipment maintenance (e.g., tracking and reporting maintenance activities or determining failure causes). For employment, the subject-context information may comprise specific details that describe the condition (e.g., workplace-related conditions, details of department, role, tenure, and/or workplace), historical data (e.g., past experiences, prior performance). The functional limitations may help the employee by identifying how different challenges (e.g., stress, workload, work-life balance) impact home and/or work tasks for the employee. The generated functional limitations may include e.g. home activities such as: “balancing family commitments,” “working from home”, “handling household chores” and work activities such as, “managing team meetings”, “handling deadlines”, “collaborating with colleagues”, “feeling supported by management”. These adaptive datasets may then be presented to the subject for receiving the input signals. The AI engine may process these input signals along with other inputs e.g., input data and selected functional limitations by leveraging the one or more machine-learning techniques including NLP, one or more fine-tuned generative AI models, and prediction models to generate a domain-specific structured report that includes one or more outputs.

FIG. 1 illustrates a block diagram 100 for generation of adaptive datasets in accordance with at least one example. In some aspects, the disclosed techniques may include generating adaptive datasets 126 (or surveys) based on input data 102 by determining functional limitations 118*a*. The input data 102 may comprise subject demographics 104 and subject-context information 106. The subject demographics 104 may include, but are not limited to, age, gender, date of birth, occupation, socioeconomic status, education, and/or location. The subject-context information 106 refers to specific details that describe the condition (e.g., medical issues, law-related matters, workplace-related condition, or equipment maintenance), historical records (e.g., prior treatments, history of symptoms, past experiences, prior negotiations or proceedings), and/or an environment, which may vary significantly depending on the application. For example, the details of healthcare conditions may comprise a description of experiencing a medical condition, affected body part, severity, or progression; for legal, it may involve an ongoing contract disagreement or injury claim; for employment, it may relate to stress, mental health, or physical conditions affecting work.

The input data 102 may be further processed by the functional limitations generator 112 to generate functional limitations 118*a* or list of actions that may be impacted by the condition or situation, making the datasets more adaptive and contextually appropriate. These functional limitations 118*a* may be reflected in one or more sets of related actions that may be affected by a condition or a condition. For example, for healthcare domain, the functional limitations generator 112 may generate functional limitations 118*a* for a subject 120 comprising a set of home activities and/or work activities, enabling the subject to select those that are most applicable to a specific context, condition, or daily routine. Based on the selected functional limitations 118*b* or tasks, the intelligent assessments generator 122 may dynamically generate adaptive datasets using a generative artificial intelligence (AI) model. This approach may assist in tailoring the dataset process to each condition or individual, improving the relevancy and efficiency of the survey.

The functional limitations generator (FLG) 112 may be configured to determine a range of functional limitations 118*a* and narrow down specific areas that may be affected by the subject demographics (e.g., house-wife, 45 years old), condition, situation, or context across different domains. The FLG 112 may utilize a combination of machine-learning techniques, particularly generative AI models and natural language processing (NLP) techniques—to analyze the input data 102. FLG 112 may first process the input data 102 to extract contextual elements 114 from the subject-reported input data 102. NLP techniques such as entity recognition, keyword extraction, and semantic analysis may be employed to determine and classify information that signals the nature of the condition and its impact. For instance, entity recognition may assist in identifying e.g., gender, role, age from the subject demographics 104 that may build a context of functional limitations 118*a*. Similarly, it may assist in identifying condition-related elements such as, “back pain,” “arthritis,” as well as “employment disagreement” or “workplace stress” that define the specific issue. Keyword extraction may further help in isolating elements from the transformed data 227 related to actions or limitations, such as “limited mobility,” “sitting,” “standing,” or “lifting,” providing the AI with tangible data points on how the issue might affect day-to-day tasks.

Once the contextual elements 114 are identified, the contextual analysis and semantic mapping may be used to understand the meaning and relationships between the extracted terms. For example, understanding that a subject 120 with “back pain” may also report difficulty with “standing for long periods” or “climbing stairs” enabling the FLG 112 to infer that these are likely functional limitations 118*a* associated with the reported condition. Similarly, if the input data 102 include information such as “suit” or “trial,” the FLG 112 may understand that this pertains to procedural limitations, such as the inability to meet deadlines, submit documents on time, or attend meetings. The generative AI model 116 may then take these contextual elements 114 and semantic relationships (e.g., in a prompt) and synthesize them into functional limitations 118*a* that are both domain-specific and adaptive. For example, in a rule-based context for a contract disagreement over land, the FLG 112 may produce functional limitations 118*a* depending on the nature of the disagreement. If the issue affects the ability of the subject to proceed with tasks, functional limitations 118*a* may include inability to continue construction, sale or purchase of land halted, or restricted access to property. Alternatively, if the trial affects the ability of the subject to engage in the process, limitations may include difficulty negotiating terms, unable to attend court hearings, or delayed input signals to inquiries.

For healthcare, the input data 102 may be leveraged by the FLG 112 to identify potential daily tasks that are impacted while managing the medical condition. For example, a subject recovering from surgery may receive a list of home activities (e.g., cooking, cleaning, and walking) and work activities (e.g., prolonged sitting, standing or lifting) generated by the functional limitations generator 112, in response to the input data 102. This model may assist the subjects by helping them determine which activities in their daily routine are impaired due to their condition. Similarly, for employee feedback surveys, the input data 102 may include contextual information such as, a work condition, details of department, role, tenure, work environment of the subject (or an employee). The functional limitations generator 112 may assist the employee by determining how different challenges (e.g., stress, workload, work-life balance) impact home and/or work activities for the employee. The FLG 112 may generate home activities such as: “balancing family commitments,” “working from home,” “handling household chores” and work activities such as, “managing team meetings,” “handling deadlines,” “collaborating with colleagues,” “feeling supported by management”.

Once the functional limitations 118*a* are generated, these functional limitations 118*a* may be availed to the subject 120 through an intuitive interaction interface, which includes one or more components corresponding to each functional limitation. These components may be configured such that the subject 120 may provide input signals for each functional limitation by selecting the corresponding components from the interface that the subject is experiencing. Based on the subject's selections, a subset of functional limitations 118*b* from the generated functional limitations 118*a* may be extracted that accords with the subject reported challenges. The intelligent assessments generator 122 may then dynamically generate adaptive datasets 126 based on the selected functional limitations (e.g., 118*b*) determined through subject selection. To generate adaptive datasets 126, contextual elements 114 may be extracted from the selected functional limitations 118*b* and the input (or transformed) data 102 to craft a second prompt. After crafting, it may be input into a generative AI model 124, which produces adaptive datasets.

The adaptive datasets 126 may comprise a set of applicable evaluation instances tailored to the input data 102, specifically focusing on the selected functional limitations 118*b*. Each evaluation instance may comprise one or more quantifiable metrices to quantitively assess functional limitations before and after the onset of the condition. For each evaluation instance, a corresponding set of input parameters may be created, reflecting different options related to the condition or condition of the subject. These input parameters may represent different aspects of the subject's functionality, and the subject may respond to these evaluation instances in two distinct contexts: a prior state (before onset of the condition) and a current state (after the onset of condition). To facilitate this, the interaction interface may present each evaluation instance with two sets of components: one set for the prior state and another for the current state. Each set of components may include the same set of input parameters, enabling the subject to select an input signal corresponding to their condition before and after the issue occurred.

For example, in healthcare, the subject may select "walking" and "lifting" from the list, where the intelligent assessments generator 122 may generate evaluation instances such as, "How comfortable are you when walking for 10 minutes?", and the associated input parameters may comprise e.g., "no discomfort," "mild discomfort," "moderate discomfort," and "severe discomfort". For the task of "lifting," the evaluation instance may ask, "How much weight can you comfortably lift without pain?" with input parameters such as "less than 10 lbs.," "10-20 lbs.," "20-30 lbs.," and "more than 30 lbs.". These evaluation instances may be generated for quantitatively assessing the individual's current ability to perform these tasks compared to their baseline ability, enabling healthcare providers to tailor treatment plans accordingly. Similarly, for employees, adaptive datasets 126 may include evaluation instances e.g., "How often do you meet work deadlines?" or "How often do you feel supported by your manager during remote work?". These sets of components may enable subject 120 to provide comparative feedback that reflects both their past and present functional status.

In some embodiments, the subject may respond to the evaluation instances based on a specific context, such as a current state or condition. In such examples, the interaction interface may present one set of components for each evaluation instance, where the set of components are associated with a set of input parameters or options corresponding to the evaluation instance for enabling subjects to provide input signals. The adaptive datasets 126 generated by the intelligent assessments generator 122 may be further populated or filled (e.g., resulting in 128) by the subject 120 in accordance with the functional limitations and needs. It should be understood that the generative AI models 116 and 124, responsible for generating functional limitations 118*a* and adaptive datasets 126, may either be the same model or different models, depending on the specific requirements of the generation process and the complexity of the underlying data.

Figure 2:
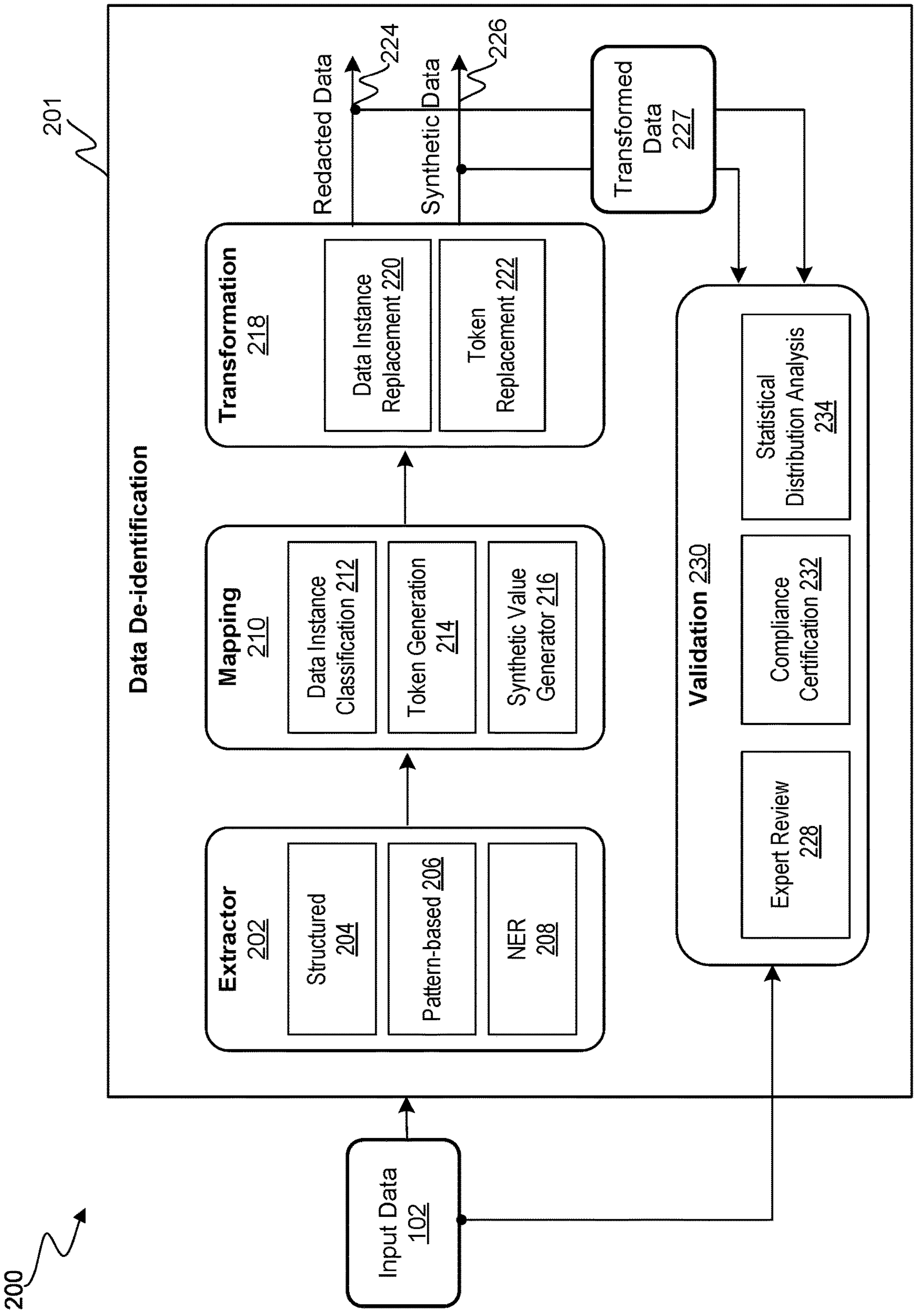
FIG. 2 illustrates an exemplary block diagram for data de-identification process in accordance with some aspects of the present disclosure.

FIG. 2 illustrates an exemplary block diagram 200 for data de-identification 201, in accordance with some aspects of the present disclosure. The data de-identification 201 may be configured as part of preprocessing during training phase to remove or replace personally identifiable information (PII associated with the input data 102 such that a subject remains anonymous while maintaining contextual integrity. PII may refer to any entity, data instance, or data element that may be used to identify an individual. The PII may include, but are not limited to, social security numbers (SSNs), phone numbers, addresses, IP (internet protocol) addresses and/or medical record (or record numbers). For artificial intelligence (AI) and data processing, handling PII securely may be a concern to comply with privacy regulations such as HIPAA (Health Insurance Portability and Accountability Act) in healthcare, GDPR (General Data Protection Regulation) in EU and other data protection laws and regulatory authorities.

The data de-identification 201 may follow a technique similar to extract, transform and load (ETL) methodology, enabling privacy compliance and preservation of data usability for applications such as training a machine-learning model and/or performing analytics. The (raw) input data 102, including subject demographics 104 and subject-context information 106, may be ingested, which may comprise structured data (e.g., database, records, structured data fields) and unstructured data (e.g., free-text condition description, emails, or logs). From this raw input data 102, data instances that are associated with the personal information identifiers may be extracted in an extractor 202 that is configured to employ a variety of techniques to extract data instances from different data formats (e.g., structured, and unstructured). Data instances extracted from structured 204 fields (i.e., 204), such as names, phone numbers, and addresses, may be directly retrieved from well-defined fields in the input data 102, where the data is provided in separate fields.

In some instances, pattern-based 206 data instances with known formats or patterns associated with personal information identifiers may be determined from structured and unstructured data by pattern matching techniques, such as regular expressions (regex), machine-learning models, and rule-based systems. Regular expressions (regex) are commonly used for detecting specific patterns in the text e.g., including emails, URLs (universal resource allocator), IP addresses, social security number (SSNs), by defining character sequences that match the expected format of personal information identifiers. For example, a regex pattern designed to identify email addresses can match sequences like "user@example.com" by looking for the presence of characters such as "@"and"."", which are typical of email formats. Similarly, for IP addresses, regex can be used to find valid numerical patterns like "192.168.1.1". When it comes to SSNs, regex can be applied to detect the pattern "XXX-XX-XXXX", where the "X" represents numeric digits. This capability may assist automated systems to scan through vast amounts of unstructured data and flag or redact sensitive personal information identifiers/identifiers, enabling compliance with data protection and privacy regulations.

Similarly, machine-learning models, particularly supervised models, can be trained to recognize data instances associated with identifiers by learning patterns from labeled datasets, making them effective in determining less structured or more varied instances of identifiers. Additionally, NER 208 data instances may be extracted from the input data using named entity recognition (NER) techniques, which are configured to determine and classify identifiers such as names, locations, organizations, and other sensitive data instances particularly within unstructured text. These models rely on contextual understanding of the data to identify data instances that may not follow a rigid pattern or format, enabling the extraction of identifiers from free-form text or mixed-content sources. By leveraging both machine-learning and NER, the extractor 202 may identify a wide range of data instances associated with identifiers, from clearly formatted data to more ambiguous or context-dependent information, enabling accurate detection across diverse data formats and data configurations.

Once data instances associated with PII have been extracted, mapping 210 may be performed including data instance classification 212 to classify each detected PII element into predefined data instance types. Typical types may include, but are not limited, names (e.g., "John Doe"→first name, last name), addresses (e.g., 123 main St, NY→street, city, state). Subsequent to data instance classification 212, token generation 214 may be performed, where for each classified PII data instance, a unique structured identifier may be generated based on the data instance type. The structured identifier may help in retaining predictable representation for similar types of data instances. For extracted data instances, additional unique identifiers may also be generated for a specific data instance value so that same PII category receives a consistent but anonymized reference throughout the dataset. As an illustrative example, a structured identifier format may comprise [ENTITY_TYPE_Unique_Identifier].

Mapping 210 may also include a synthetic value generator 216, where a generative AI model trained on anonymized datasets generates synthetic values while maintaining contextual relevance. For example, if an email address such as "johndoe@example.com" is processed, the synthetic value generator 216 may generate a new synthetic value such as, "michael.wilson@syntheticmail.com". The model may generate these synthetic values based on the statistical distribution of real-world data. The synthetic values, along with unique identifiers, may undergo transformation 218, converting the raw input data 102 into two privacy-preserving formats: redacted data 224 and synthetic data 226. The transformation 218 may assist in removing or replacing the extracted data instances associated with identifiers, while maintaining data usability for modeling and analysis. This transformation 218 may perform data instance replacement 220 and token replacement 222, swapping out the original values of extracted data instances with either synthetic values (resulting in synthetic data 226) or identifiers (resulting in redacted data 224). For instance, if an extracted data instance associated with identifiers is "John Doe," the redacted data 224 may be [FIRST_NAME_abc123], while the synthetic data 226 may be "Michael Smith." This provides privacy and traceability, while maintaining contextual integrity.

In some aspects, replacing the original values of the extracted data instances from the input data with the redacted data 224 or synthetic data 226 may comprise transformed data 227. This transformed data 227 may be validated to verify whether the transformation 218 meets privacy, compliance, and usability criteria. During validation 230, the transformed data 227 along with raw input data 102 may be submitted to a third-party for expert review 228 and compliance certification 232. Experts may validate compliance with industry regulations such as HIPAA, GDPR etc. If, for example, the transformed data 227 fails to comply with privacy checks, it may be sent back for re-processing with strict anonymization techniques. In some instances, the validation 230 may further include statistical distribution analysis 234 in which statistical properties of the original input data 102 may be compared with transformed data 227 to verify the transformation did not introduce biases. The statistical distribution analysis 234 may perform various checks including correlation preservation and distribution of categorical variables, for example, if original data had 60% males and 40% females, the synthetic data 226 should retain similar proportions.

Figure 3:
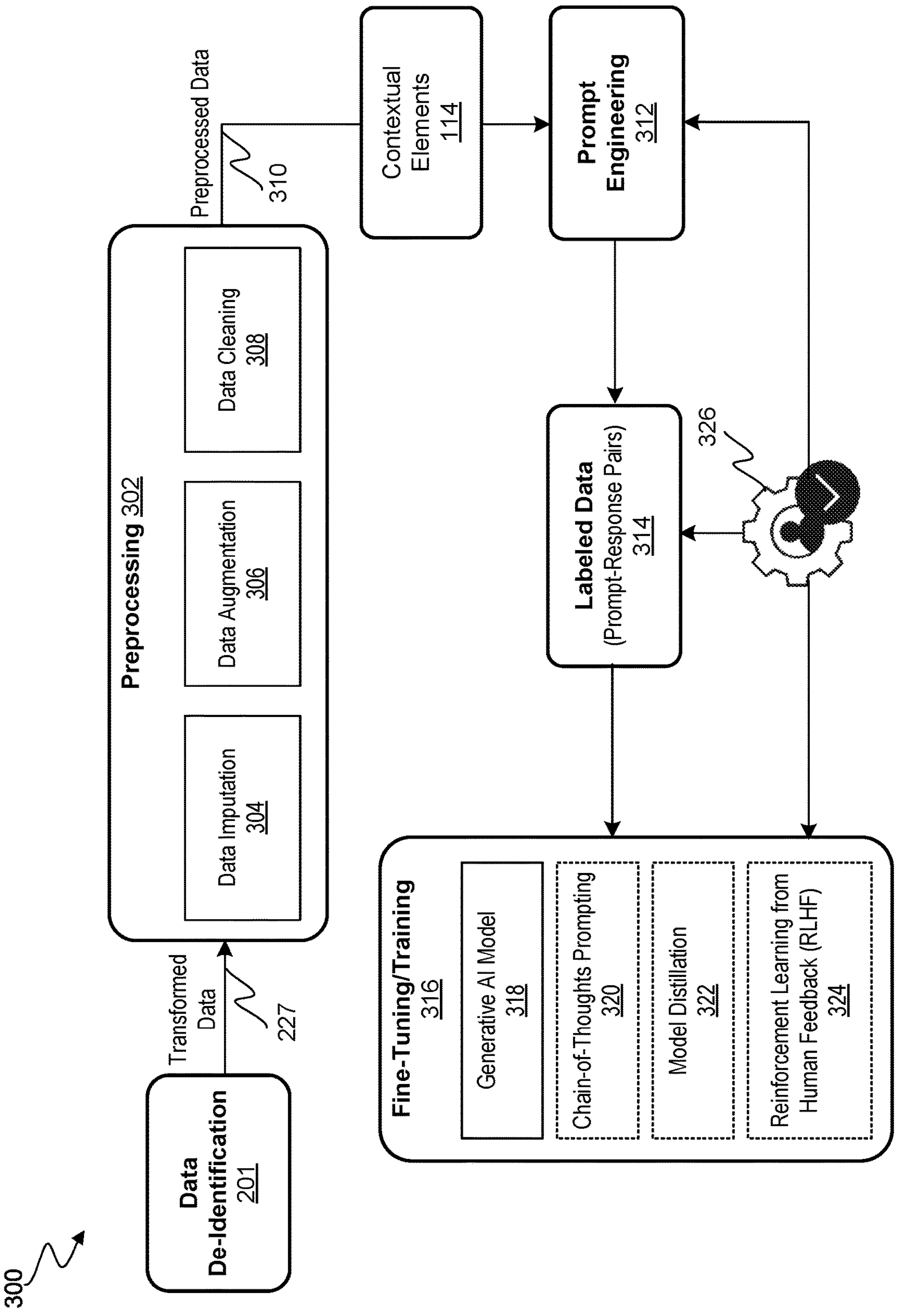
FIG. 3 illustrates an exemplary architecture for training or fine-tuning a generative artificial intelligence (AI) model in accordance with some aspects of the present disclosure.

FIG. 3 illustrates an exemplary architecture (or pipeline) 300 for training and/or fine-tuning a generative artificial intelligence (AI) model, in accordance with some aspects of the present disclosure. In some aspects, the disclosed techniques may include a model-agnostic architecture configured to support various generative AI models including large language models (LLMs) regardless of their underlying architecture or frameworks. The exemplary architecture 300 may comprise components e.g., preprocessing 302, labeled data (e.g., including prompt-response pairs) 314, prompt engineering 312 and fine-tuning/training 316. The transformed data 227 (or the input data 102) may be received as input to the preprocessing 302 block that may perform a series of operations, including data imputation 304, data augmentation 306 and data cleaning 308. Data imputation 304 may address missing or incomplete values by applying various techniques including statistical techniques, predictive modeling or generative methods depending on the nature of the data and type of the model used.

In some examples, missing data may be filled pseudo-randomly based on probabilistic models that derive information from subject demographics 104, such as occupation, marital status, and pronouns, where the likelihood of an associated value is based on known population distributions or trends. For instance, for a subject demographic category "occupation", Bayesian models may be used to estimate the probability of an individual being "employed" or "retired" based on prior knowledge of how age or gender typically correlates with these categories in the population. In other examples, statistical techniques may be applied for data imputation 304, such as filling missing values with the mean, median, or mode of the available data. This can be useful when the missing data is relatively random, and such imputation does not introduce significant bias into the dataset. For instance, if marital status is missing, imputation may involve filling it with the most common value (e.g., "married" or "single") from the existing data.

Another example of data imputation 304 may involve filling in missing values using predictive modeling, where a model is trained on the available data to predict missing values based on other features. Predictive models such as decision trees or regression models can be trained to understand the relationships between features e.g., age, gender, and marital status. For example, a decision tree model may be trained on existing data to determine the likelihood of individuals being married based on their age and gender, where the model may learn patterns such as, individuals aged 30-40 are more likely to be married. Once the model is trained, it can then be used to predict missing marital status values for other records.

In some other examples, generative approaches such as generative adversarial networks (GANs) or variational auto-encoders may be used for data imputation 304. These approaches may generate missing data by learning the underlying data distribution and synthesizing values that fit within the learned patterns. For instance, a generative model may learn how age and gender correlate with marital status across the dataset and generate plausible imputed values for missing marital status entries. This approach may be particularly useful when the missing data is complex and requires more sophisticated modeling for consistency with the rest of the dataset.

Data augmentation 306 may generate synthetic variations of data to improve generalization and model robustness. Generalization may refer to the ability of a model to perform well on unseen data, rather than memorizing the training data. By artificially expanding the dataset, data augmentation 306 may help the model become more robust to variations and patterns it may encounter in real-world applications. Data augmentation techniques may differ depending on the type of data being used e.g., images, text, or tabular data. For tabular datasets (such as structured data involving numerical and categorical values), data augmentation 306 may include techniques such as SMOTE (synthetic minority over-sampling technique), which generates synthetic examples for underrepresented classes in the data. Other techniques may involve creating slight variations in numerical values based on certain distributions or domain-specific knowledge to simulate real-world variance in the data. For example, in a dataset with missing or sparse categories, generating new instances or perturbing feature values may slightly help the model learn more robust patterns. In some other example, GANs and VAEs may be used to augment data.

Data cleaning 308 may remove inconsistencies, duplicates and formatting errors, thereby producing preprocessed data 310. In many examples, data from different sources may use different terminology or formats to represent the same information. For example, one dataset may use “Male” and “Female” for gender, while another dataset may use “M” and “F”. A data cleaning task may be to standardize the terminology across all records. Such data inconsistencies or data contradictions may be removed by defining a uniform rule for consistent values (e.g., converting “M” and “F” into “Male” and “Female”) or by removing them. Similarly, certain values may fall outside the expected range or may not match the predefined criteria, for example, including alphabets in phone numbers. Such errors may be detected by applying validation rules that check expected formats and may then correct or flag them for review. In some examples, data cleaning 308 may involve removing or merging duplicates. This may involve comparing all examples of the data based on specific identifier (e.g., email or any other identification number). Upon identification of duplicates, the redundant values may be removed or merged (e.g., by averaging numerical data or retaining the most recent record based on a timestamp).

The preprocessed data 310 may further be processed by one or more NLP techniques to extract contextual elements 114 as illustrated in FIG. 1. Based on contextual elements 114, prompt engineering 312 may craft structured prompts depending on the nature of the task or the type of response (e.g., generation of functional limitations 118*a*, synthetic data 226 or summary etc.). Once the prompts are generated, the corresponding responses may be paired with them, creating a dataset of prompt-response pairs 314. These prompt-response pairs 314 may then be validated by domain experts 326 in the field and used as labeled data for fine-tuning/training 316 the generative AI model 318. By feeding these pairs into the model, it may learn how to generate accurate, contextually appropriate responses when provided with similar prompts. The contextual elements can be interchangeably termed as features.

Prompt engineering 312 may involve crafting the prompts manually by domain experts (or human experts) 326 in accordance with the task at hand. Alternatively, crafting the prompts may be based on AI-assisted tools that include a large language model for generating template-based prompts or predefined prompt structures. AI-assisted tools may automate the process by using prompt-templates tailored to specific tasks, such as generating prompts for functional limitations based on medical conditions or employee surveys. For example, a template may structure a prompt as, “Generate a list of actions that may be impaired for a [age]-year-old [gender] with [condition],” and the AI tool may automatically populate it with applicable data (or contextual elements 114), such as “Generate a list of actions that may be impaired for a 60-year-old female with knee injury.” Predefined structures or prompt patterns may also help streamline the generation of prompts by aligning them with task-specific goals. However, despite the potential of automation, domain experts 326 are often involved in the initial design of these templates and prompt structures to align the prompts with domain knowledge and specific requirements of the task.

Once the prompts are generated, the corresponding input signals may be generated either by the domain experts 326 or by the AI-assisted tools, such as a large language model (LLM), thereby generating prompt-response pairs 314. These prompt-response pairs 314 may then be reviewed and validated by the domain experts 326. This review may enable accuracy, contextual appropriateness, and alignment of the generated input signals with real-world expectations. For example, in the medical domain, healthcare professionals may verify that the generated actions list accurately reflects the functional limitations caused by a knee injury. Similarly, in the context of employee surveys, human resource (HR) specialists may review self-report summaries to confirm that the AI-generated responses match company standards and provide actionable insights. This expert verification of labeled data 314 may help generative AI model 318 to be trained on high-quality, reliable examples, ultimately improving the model’s ability to generate accurate, domain-specific outputs during the fine-tuning/training process 316. In some aspects, the prompt provided to the generative AI model is generated from an optimized prompt-template that has been modified using a training dataset comprising labeled input-output pairs to improve output accuracy. The optimization may include algorithmic modification of instruction sequences, reordering of prompt components, and/or inclusion of representative instances derived from de-identified training data.

The fine-tuning/training 316 may leverage advanced prompting techniques such as chain-of-thought (CoT) prompting 320, model distillation 322 and reinforcement learning from human feedback (RLHF) 324 for efficiency and effectiveness of the generative AI model 318. Chain-of-thought prompting 320 is a problem-solving approach that may involve guiding the model to “think through” a problem through a coherent series of logical deductions (e.g., step-by-step) before generating a final answer or output. Instead of generating an answer based on the provided input, CoT prompting 320 may encourage the generative AI model 318 to articulate intermediate processes in its reasoning process, making its output more logical, interpretable, and grounded in the provided context. For example, if the task is to generate a self-report summary for an employee who has indicated dissatisfaction with workload, the generative AI model 318 may first consider applicable factors such as the employee's job role, specific complaints about workload, and past feedback. The generative AI model 318 may then reason through the relationship between these factors (e.g., how workload impacts job satisfaction) before finally generating a self-report summary that clearly outlines the employee's concerns and suggestions for improvement. This sequential reasoning may help generate a coherent and contextually applicable summary that aligns with the specific feedback of the employee.

Similarly, if the task is to generate a list of actions that may be impaired due to a specific health condition (e.g., knee injury), the generative AI model 318 using CoT prompting 320 may first analyze the subject demographics 104 and health condition data, breaking down applicable factors such as age, gender, and mobility level. The model may think through a logical sequence e.g., "Given age and knee injury, tasks requiring standing or walking for long periods will likely be affected." Then, based on that reasoning, the model may generate a tailored list of actions that are likely to be impaired, such as "running, climbing stairs, walking long distances.

Model distillation 322 is a technique that may be employed during fine-tuning/training 316 of the generative AI model 318, where knowledge is transferred from a larger, more complex model (the teacher model) to a smaller, more efficient model (the student model) that is fine-tuned. The teacher model, often a high-performing and computationally expensive model, is pre-trained on large datasets and is capable of generating highly accurate outputs. These outputs include soft-targets, which are probability distributions for classification tasks or detailed text sequences for generative tasks, rather than hard labels or final answers. In the distillation process, the student model, which is the model being fine-tuned, learns from the predictions and reasoning of the teacher model. For example, in a classification task, the teacher model may provide class probabilities, and the student model may learn to approximate these probabilities while being smaller and more efficient. Similarly, in LLM-based tasks, such as generating task lists for individuals with specific health conditions or crafting summaries, the teacher model may generate detailed and contextually rich text outputs. The student model may then learn to generate similar outputs, but in a more compact form, making it suitable for real-time deployment in resource-constrained environments, such as mobile devices or edge devices.

Reinforcement learning from human feedback (RLHF) 324 may enhance the performance of the generative AI model by incorporating feedback from human experts 326 into the training process. In RLHF 324, the generative AI model 318 generates initial outputs, and human experts 326 may provide feedback on the quality of those outputs. This feedback may then be used to refine the behavior of the model. The process is similar to teaching the model through trial and error, where the actions of model are rewarded based on how closely these align with human preferences. For example, in the context of self-report generation, if the model generates a report that lacks clarity or doesn't fully capture the concerns of employees, human feedback may penalize that response. Conversely, when the model produces a more accurate, detailed report, it may receive positive feedback. Over time, this process may help the generative AI model 318 improve its ability to generate outputs that align more closely with human expectations. RLHF 324 may be particularly useful in tasks that involve subjective judgment or human-like decision-making, such as generating reports or summaries from detailed data, as it directly integrates human insight into the fine-tuning or learning process.

The training or fine-tuning pipeline for non-generative AI models may follow a similar process to that of generative AI models, including data de-identification 201, preprocessing 302, and extracting contextual elements 114 to create labeled data 314 comprising input-output pairs. Non-generative AI models can encompass a variety of applications, including prediction models, traditional recommendation models (e.g., model-based filtering, collaborative filtering), and natural language processing models. However, in contrast to generative models, these models may undergo additional, model-specific preprocessing techniques. For instance, categorical variables (e.g., marital status with categories, single, married, divorced, or widowed) may undergo one-hot encoding, ordinal encoding, or nominal encoding, while numerical features are often normalized or standardized to ensure compatibility with the model's requirements and improve performance. These additional preprocessing techniques 302 enable appropriate structuring of the input data for the specific needs of each type of non-generative model.

Figure 4:
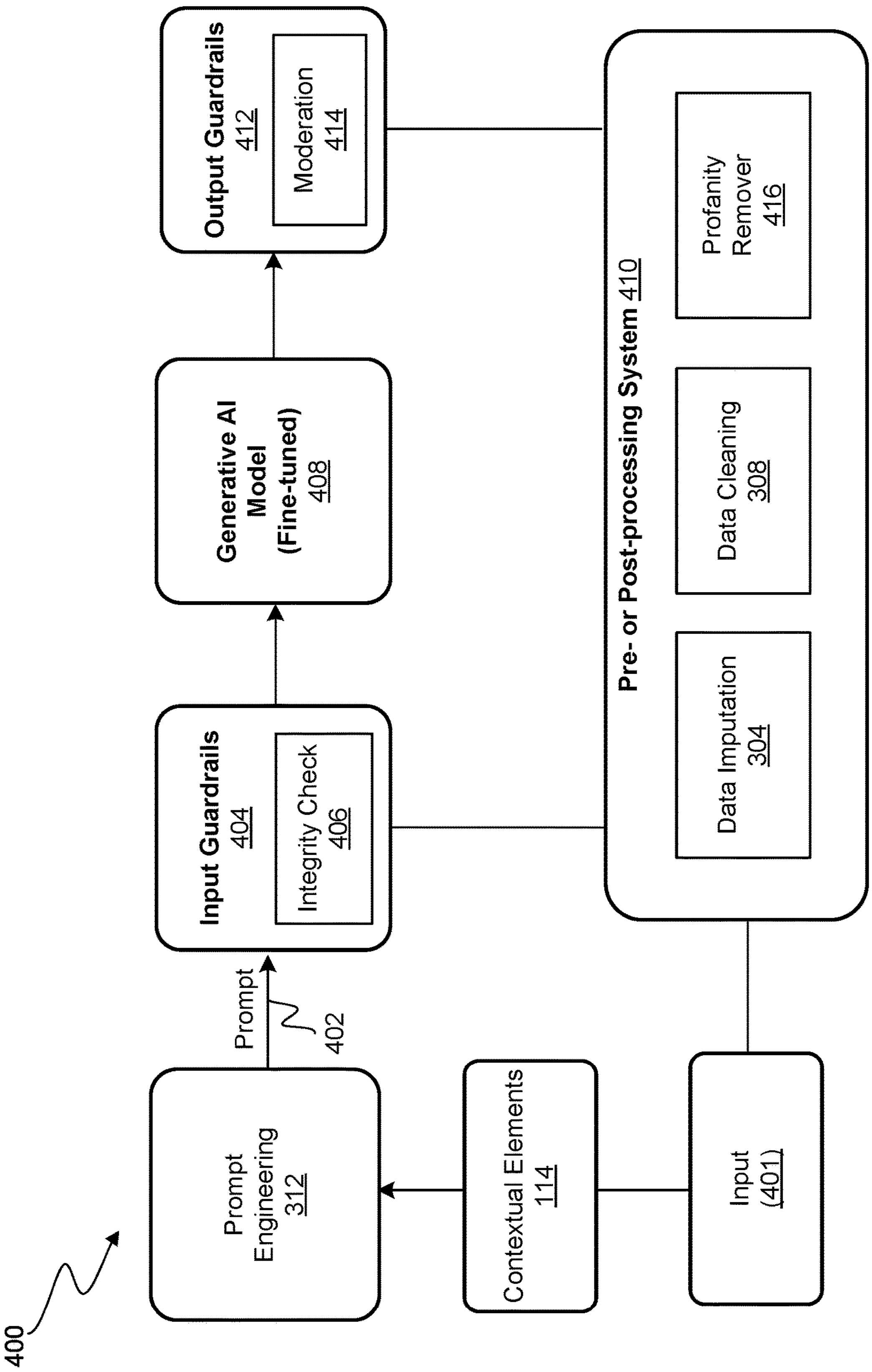
FIG. 4 shows an example inference pipeline for the generative AI model in accordance with some aspects of the present disclosure.

FIG. 4 illustrates an inference pipeline 400 for a generative artificial intelligence (AI) model 408, in accordance with some aspects of the present disclosure. The inference pipeline 400 is model agnostic, where the generative AI model 408 may represent any generative AI model (e.g., 116 or 124) employed in the present disclosure. In some aspects of the present disclosure, the prompt engineering 312 may be employed in both the training pipeline (as illustrated in FIG. 3) and the inference pipeline 400. In some aspects of the present disclosure, for performing a task with a generative AI model, a prompt 402 may be crafted. The prompt 402 may comprise an intent of performing an action (e.g., "generate functional limitations", "generate five adaptive datasets", or "generate a compact summary") and additional contextual elements 114.

The prompt 402 may be crafted manually by a human expert or, alternatively, generated dynamically by populating a prompt-template with contextual elements. These contextual elements 114 may be extracted from the input 401 that may vary depending upon the task of the generative AI model. One or more machine-learning techniques, particularly including NLP techniques such as entity recognition, keyword extraction, and semantic analysis may be used to parse and extract these contextual elements. The extracted contextual elements may be utilized to craft the prompt for the generative AI model. In some aspects, one or more input guardrails may be applied to the crafted prompt for validating prompt adherence to linguistic structures, removing any harmful content (e.g., profanities), avoiding prompt injection that may cause the generation of unintended content. Once the prompt is validated, it may be fed to the generate AI model.

The inference pipeline 400 may include input guardrails 404, a fine-tuned or trained generative AI model 408 and output guardrails 412 to enhance model integrity. The inference pipeline 400 may further include a pre- or post-processing system 410, comprising data cleaning 308, data imputation 304 and profanity removal 418. The pre- or post-processing system 410 may be employed by the crafted prompt 402 or prior to extraction of the contextual elements 114, for example, for the input 401, comprising the input data 102 or the transformed data 227. The input guardrails 404 may validate whether incoming prompts 402 conform to safety and structural integrity before being processed by the generative AI model 408. For instance, when using an LLM (large language model) for text generation, the input guardrails 404 may check for harmful content or validate whether the prompt adheres to an appropriate linguistic structure. Similarly, for a GAN (generative adversarial network) used for text-based content generation (such as generating datasets or product descriptions), input guardrails 404 may verify that the provided prompt 402 does not include any malicious intent or harmful language. The output guardrails 412 also verify that the generated output is accurate, appropriate, and free of errors or adversarial influences. The integrity check 406 may employ mechanisms to detect adversarial inputs that may skew the generated content, while pre- or post-processing 410 refine the inputs and outputs of the generative AI 408 for better alignment with the intended task, e.g., by normalizing text or removing irrelevant content.

When a generative AI model 408, such as an LLM or LSTM (long short-term memory) receives a prompt 402, it may include artifacts such as inconsistent capitalization, spelling mistakes, or extraneous punctuation, which can disrupt the understanding of the model and result in subpar outputs. For example, a text prompt comprising, "gEnErATe ad copy foR a new pr@duct!!" may include various formatting issues. Whether it's an LLM generating a marketing description or LSTM creating new content based on the learned latent space, these formatting errors may confuse the generative AI model 408. The data cleaning 308 may standardize capitalization, correct spelling, and remove unwanted characters, turning it into a more coherent prompt such as "Generate ad copy for a new product." This cleaning ensures that the input text is syntactically and semantically correct, making it easier for the generative model to process and produce high-quality, contextually accurate outputs.

Additionally, a profanity remover 416 may use fuzzy matching techniques to detect and filter out offensive or inappropriate language in both input prompts 402 and generated input signals. This is particularly useful in text-based generative models such as LLMs, GANs, or VAEs, that generate human-readable content. For example, in a situation where an inappropriate variant such as "actions for a b@d back?" is provided as a prompt, the profanity remover 416 can use fuzzy matching to identify "b@d" as a variant of "bad" and adjust it accordingly. This enables the generative AI model remains within safe and ethical boundaries while still being effective in generating input signals. The cleaned-up prompt might be transformed into "actions for a painful back?", keeping it both neutral and contextually applicable.

Once the generative AI model 408 generates an output, output guardrails 412 may be applied so that the generated content or input signals adheres to predefined safety and compliance standards. The output guardrails 412 may perform moderation 414 by utilizing a large language model (LLM) to categorize outputs into predefined moderation categories. If, for example, a generated input signal is classified under restricted categories such as illegal content, child abuse, hate speech, malware, physical or economic harm, fraud, adult content, and/or unqualified law, health or financial advice, the output may be rejected. However, in healthcare applications, some categories such as unqualified health and physical harm may be allowed under controlled conditions in generated input signals or prompts pertaining to condition or injury of the subject.

FIG. 5 illustrates an exemplary network 500 for adaptive dataset and summarization in accordance with some aspects of the present disclosure. In some aspects, an artificial intelligence (AI) engine 502 is disclosed that is configured to process multiple inputs to generate a provider documentation comprising various customizable sections. The provider documentation may include one or more domain-specific structured outputs that may be generated based on multiple inputs. For example, the AI engine 502 may receive generated data e.g., adaptive datasets 126 (and functional limitations 118*a*); and subject-reported data e.g., selected functional limitations 118*b*, filled dataset input signals 128 and input data 102 (including subject demographics 104 and subject-context information 106). Upon receiving these multiple inputs, the AI engine 502 may leverage a combination of techniques including prediction models 518, natural language processing techniques (NLP) 520, a recommendation system 522, and one or more generative AI models e.g., 524*a*, . . . 524*n* to generate domain-specific structured outputs. It should be understood that generative AI models 524*a-n*, 116, and 124 may represent the same generative AI model or different generative AI models.

The AI engine 502 may be configured to operate in various application domains, including but not limited to healthcare, financial analysis, equipment maintenance, cybersecurity, law documentation, and risk dataset, due to its ability to process complex data and present structured summaries. This makes it applicable in a wide range of fields where detailed insights and informed decision-making are incorporated. The domain-specific structured outputs may comprise various configurable sections that may be generated or adapted in accordance with a given application domain or a preference of a provider such as a law firm or a healthcare facility. For example, domain-specific structured outputs may include a subjective section comprising e.g. user narrative report 506, history of current condition 508, and applicable influencing factors 510. Similarly, other sections may include a recommendation section and a dataset section comprising a prior state 512, and a current state 514. It may be understood that AI engine 502 is configurable to generate domain-specific outputs either in a structured format or as a free-text summary, presented in a clear and coherent natural language format. By adapting to diverse inputs and objectives, AI engine 502 may provide valuable insights across many industries, from tracking patient conditions in medical industry to drafting legal cases for clients.

For the subjective section, the user narrative report 506 may comprise a structured format or summary in a clear, easy-to-understand natural language format capturing self-reported details applicable to a particular domain. This report may process the input data 102 such as the subject demographics 104, context-specific information (e.g., 106 including the condition being experienced, such as a medical condition, legal issue, or work-related challenges), and any functional limitations 118*b* in daily activities caused by the issue as reported by the subject 120. The AI engine 502 may generate a narrative by integrating various data points, such as the contextual elements 114 from the condition, its impact on functional limitations 118*b*. By processing this data, the AI engine 502 generates a clear narrative that reflects the experience and challenges of the subject, offering valuable context for stakeholders across different fields, whether healthcare providers, professionals, or employers. An illustrative example of the user narrative report 506 in healthcare domain may comprise, "The patient is experiencing chronic back pain for the past 6 months, which he attributed to a herniated disc in his lumbar region. The pain varies in severity, worsens after prolonged activities e.g., walking over 10 minutes or prolonged postures and lifting objects." Similarly, for law domain, the subject narrative report may include, "The client reports a denial of rightful compensation by the employer despite fulfilling formalities and obligations under employment agreement."

The history of the current condition 508 may include a longitudinal record, presented either in a structured format or as a natural language summary, detailing the progression, triggers, and past interventions applicable to the problem or condition. This history may incorporate dataset input signals 128, where the subject objectively specifies severity and progression. From input data 102, prior involvements or prior experience for addressing the issue may be analyzed. The history of current condition 508 for the subject in the healthcare domain may comprise development of symptoms, history of treatment and progression of the subject's current conditions. For example, "Initially, the patient experienced mild pain, which progressively worsened despite prescribed physical therapy and anti-inflammatory medications." Similarly, for the law domain, the history of the current condition 508 may comprise, "The disagreement originated from a contract ambiguity, followed by multiple unsuccessful attempts at mediation before formal litigation commenced. Over time, various settlement proposals were made, but none gained traction, leading to a prolonged courtroom battle that is still unresolved."

The domain-specific structured outputs may further include applicable influencing factors 510 that are currently or will be impacting or influencing the current condition of the subject in the structured format or in natural language format. The influencing factors 510 may be extracted either directly from the self-reported data of the subject (e.g., input data 102 or dataset input signals 128) or derived through the prediction models 518. In the healthcare domain, for instance, the AI engine 502 may analyze inputs e.g., from a database 504 such as medical history, symptoms, lifestyle factors, and dataset input signals 128 to determine comorbidities or external factors that may affect the course of treatment. For example, if the subject reports having chronic back pain, the AI engine 502 may cross-reference this condition with other reported factors such as sleep disorders, anxiety, obesity, or osteoarthritis, which are known to exacerbate pain or hinder recovery. Using natural language processing (NLP) 520 and prediction models 518, the AI engine 502 may generate an output such as: "Relevant influencing factors include sleep disorder, anxiety, obesity, and osteoarthritis, all of which may significantly impact the patient's response to treatment." Similarly, for the law domain, if the client reports a lack of sufficient written documentation or mentions financial instability at the employer's side, AI engine 502 may deduce that these factors may contribute to delays in the proceedings. The AI engine 502 may then generate an output: "The client's case is impacted by a lack of written documentation and due to financial instability of the employer, the settlement process may be delayed leading to prolonged litigation and uncertainty regarding the outcome."

For the dataset section, the prior state 512 may include a structured dataset of performance or functional aspects with respect to quantifiable metrices before the onset of the issue. The prior state is typically derived from a combination of subject-reported data, historical records (e.g., from the database 504) and quantifiable metrices (e.g., from dataset input signals 128) that provide a measurable and unbiased understanding of the previous functionality status. For the illustrative example in healthcare, the prior state 512 may include a structured format or summary of the subject's level of function prior to the current condition including activities that the subject used to participate in, and quantifiable metrices as to their prior level of function. For example, "The patient had full range of motion (0-130 degrees) in the lumber spine and was able to walk 1 mile within 20 minutes without any pain. He was engaged in actions such as jogging, playing tennis on weekly basis."

Analogous to prior state 512, the current (functional) state 514 may include a structured dataset of performance or functional aspects with respect to quantifiable parameters following the onset of the issue. This dataset may determine how the issue has impacted the individual, system, or process, comparing the current state 514 to the prior state 512 to identify any changes or impairments. Additionally, based on the specific domain, other datasets that report current status of the subject may be generated by leveraging the one or more generative AI models 524*a-n*. For the healthcare example, a number of different types of free-text datasets may document the subject's current condition and prognosis. These datasets can include pain determination using standardized scales, such as a numerical pain rating from 0 (no pain) to 10 (worst pain imaginable) or categorical descriptors such as, "mild," "moderate," and "severe". The dataset section may be further refined by incorporating function limitation reporting (FLR) survey scores. These scores may be derived either from a predefined FLR survey specific to body parts—such as knee injury and osteoarthritis outcome score (KOOS) for knee-related issues or the Oswestry Disability Index (ODI) for lower back conditions—and/or from the adaptive datasets 126 dynamically generated based on the subject-reported condition.

In some embodiments, the present disclosure provides several advantages. For example, in addition to capturing the current (functional) status, these datasets also determine the potential for score improvement. For instance, if a patient initially reports severe difficulty in performing daily activities (e.g., an ODI score of 60 indicating significant disability), the dataset may predict a possible improvement to a lower score (e.g., 30) based on expected recovery trajectories, therapeutic interventions, or rehabilitation progress. By incorporating both current state 514 and projected improvement, these datasets may help in formulating targeted treatment plans and setting realistic recovery expectations.

In some embodiments, the present disclosure provides a technical improvement by reducing computational overhead and improving data completeness. By filtering a set of functional limitations into a subset based on user input, the system reduces unnecessary downstream processing. Further, capturing both a prior state and a current state through adaptive datasets enables structured comparison, resulting in more accurate and consistent machine-readable outputs. This improves the efficiency of automated data processing and structured report generation systems.

In some examples, the provider documentation may include a recommendation section including recommendations 516 for appropriate actions, interventions, long-term goals or next steps based on applicable data e.g., the determined functional limitations 118*b*, prior state 512 and current state 514. The long-term goals may represent one or more measurable objectives driven by the determined functional limitations of the subject, as well as the input signals from adaptive datasets, enabling alignment with applicable regulatory or industry standards. For the healthcare example, the recommendation section may include recommended treatments tailored to a specific subject, selected from a predefined list of available treatments or treatment templates used at a particular medical facility. The long-term goals may be motivated by patient functional limitations or instrumental tasks of daily life (IADLs) making them compliant with Medicare/Medicaid requirements.

These recommendations 516 may be generated through the recommendation system 522 following a hybrid approach that combines large language models (LLMs) with traditional machine-learning techniques, such as model-based filtering, collaborative filtering, memory-based filtering, content-based filtering, and/or decision trees. The recommendation system 522 may suggest a range of motion (ROM) measurements to support diagnosis and assess progress towards long-term (functional) goals. It may also recommend strength tests and manual muscle testing (MMT) datasets to further refine the evaluation of the subject's condition. Furthermore, the recommendation system 522 may determine whether the provider should ask the subject to complete the FLR survey, if it has not already been completed, to better track progress and support diagnostic accuracy.

The recommendation system 522 may be trained on historical data of subjects, leveraging past treatment decisions and outcomes to inform its suggestions. Additionally, the recommendation system 522 may include an additional model that recommends treatments based on published evidence-based clinical practice guidelines (CPGs). By assembling results from both the historical data-driven pipeline and the best-practice-based pipeline, the AI engine 502 may provide balanced treatment recommendations, enabling alignment with both empirical data and established medical standards.

Additionally, the recommendation system 522 may also assist the providers in determining whether a subject should complete specific pain scale questionnaires for particular body parts. These questionnaires typically prompt subjects to report their pain levels in various conditions—such as their "at best," "at worst," and "current" pain experiences—while also gathering additional details about the nature of the pain, such as whether it is sharp, dull, burning, or radiating. This process may be driven by an LLM-based system that dynamically determines subject-reported symptoms and clinical context to determine the necessity of such datasets. Additionally, the system may integrate an evidence-based recommendation process, ensembling outputs from both data-driven models and established clinical guidelines to refine and improve pain dataset strategies. By enabling the appropriate use of pain scales, this approach enhances diagnostic accuracy and supports more adaptive treatment planning.

FIG. 6 illustrates an exemplary workflow 600 that relates to real-time intelligent datasets and report generation by leveraging generative artificial intelligence (AI) models based on input data. The blocks in workflow 600 are illustrated in a specific order, while the order can be modified, for example, some blocks may be performed before others, and some blocks may be performed simultaneously. At block 602, the input data 102 may be received comprising subject demographics 104 (e.g., age, gender, and socioeconomic status) and subject-context information 106 that may include a description of a condition and historical records of a subject.

The techniques discussed in the current disclosure include employing machine-learning techniques e.g., natural language processing (NLP) and generative AI models, to determine functional limitations 118*b* that represent areas or activities potentially affected by the condition. Based on the input data 102, a set of functional limitations that are impacted by the condition may be generated by leveraging one or more machine-learning techniques that are configured to extract contextual elements 114 by processing the input data 102, at block 604. At block 606, the set of functional limitations 118*a* may be availed to the subject 120 via an interaction interface that may include one or more interactive components associated with a functional limitation. These components may be configured to receive one or more input signals obtained by responses from the subject with respect to the functional limitation.

At block 608, a subset of functional limitations 118*b* may be extracted from the set of functional limitations 118*a* based on the input signal that may be associated with the functional limitation by analyzing the subject selections e.g., through parsing or matching techniques. Based on the subset of functional limitations 118*b*, adaptive datasets 126 may be dynamically generated comprising a plurality of evaluation instances that are applicable to the input data 102 and a set of input parameters associated with each evaluation instance of the plurality of evaluation instances, at block 610. The evaluation instances can be interchangeably termed as queries. These adaptive datasets may be generated using a second generative AI model of the one or more machine-learning techniques such that the evaluation instances are applicable and contextually aligned with the input data and extracted functions limitations.

Figure 7:
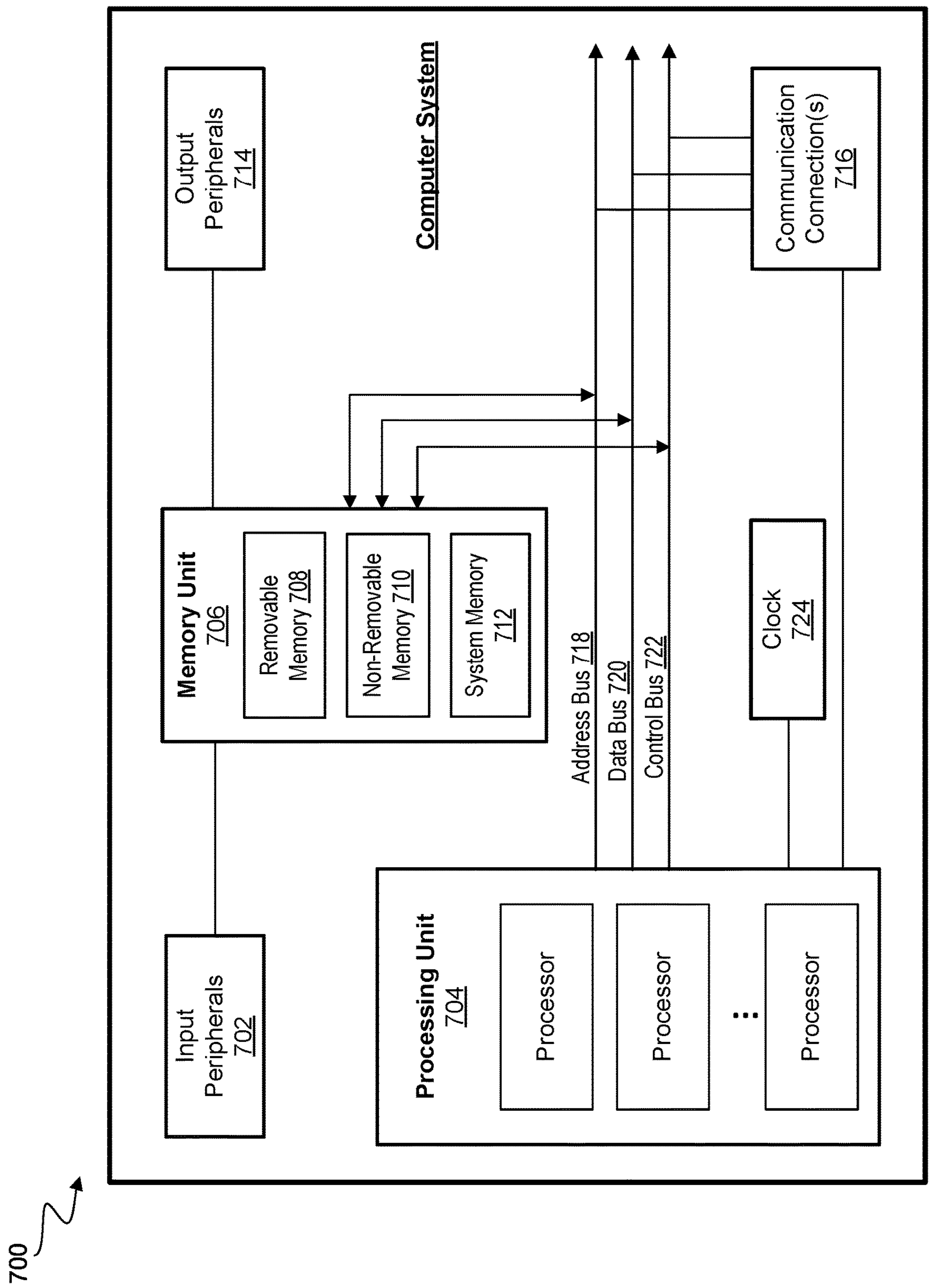
FIG. 7 illustrates an exemplary computer system that may be used to implement certain aspects of the disclosed techniques.

FIG. 7 depicts an exemplary computer system that may be utilized to implement certain aspects of the techniques disclosed herein. In some aspects, the functionality described can be carried out, at least in part, by one or more hardware logic components. Examples of such hardware logic components include, but are not limited to, field-programmable gate arrays (FPGAs), application-specific integrated circuits (ASICs), application-specific standard products (ASSPs), system-on-a-chip systems (SOCs), and complex programmable logic devices (CPLDs), among others. These components can implement a variety of analog, digital, and/or mixed-signal functionalities within a substrate.

To provide further context for various aspects, FIG. 7 and the following description offer a general overview of computer system 700, in which the different aspects can be implemented. Although the above description is framed in the context of computer-executable instructions running on one or more computers, those skilled in the art will appreciate that a novel implementation can also be realized by combining other program modules and/or through a combination of hardware and software. The computer system 700, used to implement various aspects, includes a processing unit 704 with one or more processors (also known as microprocessors), a computer-readable storage medium (which refers to any physical device or material on which data can be electronically and/or optically stored and retrieved), such as memory or storage unit 706. Computer-readable storage media may include magnetic disks, optical disks, solid-state drives, external memory systems, and flash memory drives, among others, all interconnected via a system bus.

In some aspects, processing unit 704 may include various commercially available microprocessors, such as single-processor or multi-processor units, as well as single-core or multi-core processing and/or storage circuits. Additionally, those skilled in the art will recognize that the novel system and methods can be implemented with a variety of computer system configurations, including minicomputers, mainframe computers, personal computers (e.g., desktop, laptop, tablet PC), handheld computing devices, microprocessor-based or programmable consumer electronics, and similar devices. Each of these configurations can be interconnected with one or more associated devices.

In some aspects, computer system 700 may be one of several systems used in a data center or as part of computing resources (both hardware and/or software) that support cloud computing services for portable and/or mobile computing devices, such as wireless communication devices, cellular phones, and other mobile-capable devices. Cloud computing services include, but are not limited to, infrastructure as a service, platform as a service, software as a service, storage as a service, desktop as a service, data as a service, security as a service, and APIs (application programming interfaces) as a service, for example. In some aspects, system memory 712 may include computer-readable storage (physical storage media) such as volatile memory (e.g., random-access memory (RAM)) and non-volatile memory (e.g., read-only memory (ROM)). A basic input/output system (BIOS) may be stored in non-volatile memory, providing basic routines that enable communication of data and signals between components in computer system 700, particularly during startup. Additionally, the volatile memory can include high-speed RAM, such as static RAM, for caching data.

In at least one example, computer system 700 may have additional features or functionality. For example, computer system 700 may also include additional data memory or storage devices (removable and/or non-removable) such as, for example, magnetic disks, optical disks, or tape. Such additional memory devices are illustrated in FIG. 7 by removable memory 708 and non-removable memory 710. Computer-readable media may include, at least, two types of computer-readable media, namely computer storage media and communication media. Computer storage media may include volatile and non-volatile, removable, and non-removable media implemented in any method or technology for storage of information, such as computer-readable instructions, data structures, program modules, or other data. Additionally, clock 724 is a component that governs the timing operations of computer system 700, enabling synchronized execution of processes and efficient management of data flow. The clock signal generated by clock 724 is used to synchronize data transfers between the system's various components, including storage or memory unit 706, and processing units 704. By providing a consistent timing signal, clock 724 helps maintain the stability and performance of the system, particularly during high-speed operations and multitasking scenarios.

In some aspects, system memory 712, removable memory 708, and non-removable storage 710 are all examples of computer storage media, which are part of memory unit 706. Computer storage media encompasses various types, including but not limited to RAM, ROM, EEPROM, flash memory, or other memory technologies, as well as CD-ROM, digital versatile disks (DVDs), and other optical storage media. It also includes magnetic cassettes, magnetic tape, magnetic disk storage, and other magnetic storage devices, along with any other non-transmission medium capable of storing information that can be accessed by computing system 700. These types of computer storage media may be integrated into computing system 700. Furthermore, the computer-readable media may contain computer-executable instructions that, when executed by one or more processors, perform the various functions and operations described herein. In contrast, communication media pertains to computer-readable instructions, data structures, program modules, or other data encoded in a modulated data signal, such as a carrier wave or other transmission method. As defined herein, computer storage media does not include communication media.

In some aspects, computing system 700 may also include input peripherals 702, such as a keyboard, mouse, pen, voice input device, touch input device, and others. Output peripherals 714, such as a display, speakers, printer, etc., may also be included. These devices are well-known and not discussed in detail here. Additionally, computing system 700 may feature communication connections 716, which enable the device to communicate with other computing devices, such as over a network. These networks can be wired or wireless. In some aspects, communication connections 716 are examples of communication media. Computing system 700 is one example of a suitable device and should not be construed as limiting the scope of use or functionality of the described embodiments.

Other well-known computing systems, devices, environments, and/or configurations that may be compatible with the described embodiments include, but are not limited to, personal computers, server computers, handheld or laptop devices, multiprocessor systems, microprocessor-based systems, set-top boxes, game consoles, programmable consumer electronics, network PCs, minicomputers, mainframe computers, and distributed computing environments that involve any of these systems or devices. For example, some or all components of computing system 700 may be implemented in a cloud computing environment, where resources and services are made available over a computer network for selective use by user devices.

As an example, system memory 712 also illustrates program modules, which can include client applications, web browsers, mid-tier applications, relational database management systems (RDBMS), program data, and an operating system. Operating systems may include various versions of Microsoft Windows®, Apple Macintosh®, Linux operating systems, and commercially available UNIX® or UNIX-like systems (such as the variety of GNU/Linux operating systems, Google Chrome OS, etc.), along with mobile operating systems like iOS, Windows® Phone, Android OS, BlackBerry® OS, and Palm® OS. Generally, programs comprise routines, methods, data structures, and other software components that perform specific tasks, functions, or implement certain abstract data types. Portions of the operating system, program modules, and program data can also be cached in memory, whether in volatile or non-volatile memory. It should be noted that the architecture described can be implemented using various commercially available operating systems or combinations thereof (e.g., virtual machines).

In at least one example, system bus provides an interface for system components, including, but not limited to, system memory 712, and connects to the processing unit 704. The system bus is a crucial communication pathway that facilitates data transfer between various system components. In at least one example, system bus can be of any of several types of bus structures, such as address bus 718, data bus 720, and control bus 722, each serving a distinct role. The address bus 718 is responsible for transmitting memory addresses to locate data, the data bus 720 carries the actual data between the processing unit and memory, and the control bus 722 carries control signals to coordinate data transfers and operations. The system bus can further interconnect to additional buses, such as a memory bus (with or without a controller), and a peripheral bus (e.g., PCI, PCIe, AGP, LPC, etc.), using any of a variety of commercially available bus architectures. This bus system ensures seamless communication and efficient data flow between the processing unit, memory, and other peripheral devices.

Although specific aspects have been described, various modifications, alterations, alternative constructions, and equivalents are possible. Embodiments are not restricted to operation within certain specific data processing environments but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described aspects may be used individually or jointly.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The present description provides preferred exemplary embodiments only, and is not intended to limit the scope, applicability, or configuration of the disclosure. Rather, the present description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the present description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A computer-implemented method including:

receiving input data comprising subject demographics and subject-context information that include a description of a condition and historical data associated with the condition of a subject;

generating, based on the input data, a set of functional limitations that are impacted by the condition through leveraging one or more machine-learning techniques that are configured to extract features by processing the input data, wherein a first generative artificial intelligence (AI) model of the one or more machine-learning techniques generates the set of functional limitations based on the extracted features;

availing the set of functional limitations to the subject via an interaction interface, wherein the interaction interface includes one or more interactive components associated with a functional limitation of the set of functional limitations configured to receive one or more input signals that correspond to the functional limitation;

extracting a subset of functional limitations from the set of functional limitations based on the one or more input signals associated with the functional limitation of the set of functional limitations;

generating, based on the subset of functional limitations, dynamically adaptive datasets comprising a plurality of evaluation instances that are applicable to the input data by a second generative AI model of the one or more machine-learning techniques, wherein:

an evaluation instance of the plurality of evaluation instances includes a set of input parameters for the subject to choose from, and wherein the evaluation instance includes one or more quantifiable parameters to quantitatively assess the subset of functional limitations, and the dynamically adaptive datasets are configured to capture, for each evaluation instance, a prior state and a current state of the subject corresponding to the subset of functional limitations based on input signals received via the interaction interface; and generating, by leveraging an artificial intelligence (AI) engine, a structured output based on the dynamically adaptive datasets, wherein the structured output is generated by comparing the prior state and the current state to determine condition-specific changes associated with the subset of functional limitations.

2. The computer-implemented method of claim 1, further including:

availing, via the interaction interface, the dynamically adaptive datasets to the subject, wherein the interaction interface includes two sets of components associated with the set of input parameters, and wherein, for each evaluation instance of the plurality of evaluation instances, a first set of components of the two sets of components is configured to receive a first input signal that corresponds to the prior state of the subject and a second set of components of the two sets of components is configured to receive a second input signal that corresponds to the current state of the subject; and determining, for each evaluation instance of the plurality of evaluation instances, the first input signal and the second input signal by an AI engine.

3. The computer-implemented method of claim 1, wherein the structured output includes one or more outputs comprising:

a subject narrative description in a natural language format capturing self-reported details based on the input data and the subset of functional limitations;

a longitudinal record in the natural language format detailing the prior state of the subject and prior interventions or past experiences applicable to the condition;

one or more applicable influencing factors that currently are or will be impacting the current state of the subject at a predefined time by accessing historical records of the subject;

the prior state in the natural language format including a functional dataset with respect to the one or more quantifiable parameters before an onset of the condition;

the current state after the onset of the condition in the natural language format including the functional dataset with respect to the one or more quantifiable parameters to identify a change based on a comparison with the prior state; and one or more measurable objectives that are based on the subset of functional limitations, the prior state and the current state.

4. The computer-implemented method of claim 1, wherein:

the one or more machine-learning techniques are trained on a deidentified dataset that comprises transformed data associated with each subject of a plurality of subjects, generated by applying data de-identification to the input data, wherein the data de-identification is configured to replace identity information associated with each subject with synthetic data such that a subject remains anonymous, and wherein the data de-identification including:

extracting a set of data instances associated with the identity information from the input data;

classifying the set of data instances into one or more data instance types that are predefined;

generating a structured identifier to uniquely identify each data instance of the set of data instances with respect to an associated data instance value and a data instance type of the one or more data instance types;

generating the synthetic data by applying a third generative AI model of the one or more machine-learning techniques configured to replace the structured identifier associated with each data instance of the set of data instances with a synthetic value;

validating the synthetic data to verify whether the generated synthetic data comply with predefined usability and privacy criteria; and incorporating the synthetic data into the input data to generate the transformed data.

5. The computer-implemented method of claim 1, wherein the generation of the set of functional limitations further including:

optimizing a prompt-template using a training dataset comprising labeled input-output pairs to modify one or more of instruction sequences, parameter ordering, or inclusion of representative instances;

crafting a prompt configured to generate the set of functional limitations by populating the prompt-template optimized with the extracted features; and inputting the prompt to the first generative AI model to generate the set of functional limitations.

6. The computer-implemented method of claim 1, further comprising:

applying, for each generative AI model of the one or more generative AI models, one or more input guardrails to an input and one or more output guardrails to an output to validate that the input and the output of each generative AI model conforms to predetermined linguistic structures, safety protocols and regulations, wherein:

the application of the one or more input guardrails includes filtering out offensive or inappropriate language by applying a fuzzy matching technique;

the one or more input guardrails include verifying that the input to each generative AI model of the one or more machine-learning techniques is refined from an adversarial prompt that skew the output of each generative AI model from an intended task;

the one or more output guardrails include a prompted call to a large language model of the one or more machine-learning techniques to verify the output of each generative AI model is refined from a set of moderation categories, wherein the set of moderation categories includes at least one of child abuse, hate speech, malware, physical or economic harm, fraud, adult content, and/or unqualified law, health or financial advice.

7. The computer-implemented method of claim 1, further comprising:

applying data imputation to pseudo-randomly fill missing information in a training dataset derived from the input data prior to training of the one or more machine-learning techniques, based on a probabilistic model that derives the missing information from the subject demographics.

8. The computer-implemented method of claim 1, further comprising:

cleaning the input data to remove inconsistencies, duplicates, and formatting errors.

9. A system comprising:

one or more data processors; and a non-transitory computer readable storage medium containing instruction which, when executed on the one or more data processors, cause the one or more data processors to perform a set of operations including:

receiving input data comprising subject demographics and subject-context information that include a description of a condition and historical data associated with the condition of a subject;

generating, based on the input data, a set of functional limitations that are impacted by the condition by leveraging one or more machine-learning techniques that are configured to extract features by processing the input data, wherein a first generative artificial intelligence (AI) model of the one or more machine-learning techniques generates the set of functional limitations based on the extracted features;

availing the set of functional limitations to the subject via an interaction interface, wherein the interaction interface includes one or more interactive components associated with a functional limitation of the set of functional limitations configured to receive one or more input signals that correspond to the functional limitation;

extracting a subset of functional limitations from the set of functional limitations based on the one or more input signals associated with the functional limitation of the set of functional limitations;

generating, based on the subset of functional limitations, dynamically adaptive datasets comprising a plurality of evaluation instances that are applicable to the input data by a second generative AI model of the one or more machine-learning techniques, wherein:

an evaluation instance of the plurality of evaluation instances includes a set of input parameters for the subject to choose from, and wherein the evaluation instance includes one or more quantifiable parameters to quantitatively assess the subset of functional limitations, and the dynamically adaptive datasets are configured to capture, for each evaluation instance, a prior state and a current state of the subject corresponding to the subset of functional limitations based on input signals received via the interaction interface; and generating, by leveraging an artificial intelligence (AI) engine, a structured output based on the dynamically adaptive datasets, wherein the structured output is generated by comparing the prior state and the current state to determine condition-specific changes associated with the subset of functional limitations.

10. The system of claim 9, wherein the set of operations further including:

availing, via the interaction interface, the dynamically adaptive datasets to the subject, wherein the interaction interface includes two sets of components associated with the set of input parameters, and wherein, for each evaluation instance of the plurality of evaluation instances, a first set of components of the two sets of components is configured to receive a first input signal that corresponds to the prior state of the subject and a second set of components of the two sets of components is configured to receive a second input signal that corresponds to the current state of the subject; and determining, for each evaluation instance of the plurality of evaluation instances, the first input signal and the second input signal by an AI engine.

11. The system of claim 9, wherein the structured output includes one or more outputs comprising:

a subject narrative description in a natural language format capturing self-reported details based on the input data and the subset of functional limitations;

a longitudinal record in the natural language format detailing the prior state of the subject and prior interventions or past experiences applicable to the condition;

one or more applicable influencing factors that currently are or will be impacting the current state of the subject at a predefined time by accessing historical output of the subject;

the prior state in the natural language format including a functional dataset with respect to the one or more quantifiable parameters before an onset of the condition;

the current state after the onset of the condition in the natural language format including the functional dataset with respect to the one or more quantifiable parameters to identify a change based on a comparison with the prior state; and one or more measurable objectives that are based on the subset of functional limitations, the prior state and the current state.

12. The system of claim 9, wherein the one or more machine-learning techniques are trained on a deidentified dataset that comprises transformed data associated with each subject of a plurality of subjects, generated by applying data de-identification to the input data, wherein the data de-identification is configured to replace identity information associated with each subject with synthetic data such that a subject remains anonymous, and wherein the data de-identification including:

extracting a set of data instances associated with the identity information from the input data;

classifying the set of data instances into one or more data instance types that are predefined;

generating a structured identifier to uniquely identify each data instance of the set of data instances with respect to an associated data instance value and a data instance type of the one or more data instance types;

generating the synthetic data by applying a third generative AI model of the one or more machine-learning techniques configured to replace the structured identifier associated with each data instance of the set of data instances with a synthetic value;

validating the synthetic data to verify whether the generated synthetic data comply with predefined usability and privacy criteria; and incorporating the synthetic data into the input data to generate the transformed data.

13. The system of claim 9, wherein the generation of the set of functional limitations further including:

optimizing a prompt-template using a training dataset comprising labeled input-output pairs to modify one or more of instruction sequences, parameter ordering, or inclusion of representative instances;

crafting a prompt configured to generate the set of functional limitations by populating the prompt-template with the extracted features; and inputting the prompt to the first generative AI model to generate the set of functional limitations.

14. The system of claim 9, wherein the set of operations further comprising:

applying, for each generative AI model of the one or more generative AI models, one or more input guardrails to an input and one or more output guardrails to an output to validate that the input and the output of each generative AI model conforms to predetermined linguistic structures, safety protocols and regulations, wherein:

application of the one or more input guardrails includes filtering out offensive or inappropriate language by applying a fuzzy matching technique;

the one or more input guardrails include verifying that the input to each generative AI model of the one or more machine-learning techniques is refined from an adversarial prompt that skew the output of each generative AI model from an intended task;

the one or more output guardrails include a prompted call to a large language model of the one or more machine-learning techniques to verify the output of each generative AI model is refined from a set of moderation categories, wherein the set of moderation categories includes at least one of child abuse, hate speech, malware, physical or economic harm, fraud, adult content, and/or unqualified law, health or financial advice.

15. The system of claim 9, wherein the set of operations further comprising:

applying data imputation to pseudo-randomly fill missing information in a training dataset derived from the input data prior to training of the one or more machine-learning techniques, based on a probabilistic model that derives the missing information from the subject demographics.

16. A computer-program product comprising a non-transitory machine readable storage medium having instructions stored therein and configured to cause one or more data processors to perform a set of operations comprising:

receiving input data comprising subject demographics and subject-context information that include a description of a condition and historical data associated with the condition of a subject;

generating, based on the input data, a set of functional limitations that are impacted by the condition by leveraging one or more machine-learning techniques that are configured to extract features by processing the input data, wherein a first generative artificial intelligence (AI) model of the one or more machine-learning techniques generates the set of functional limitations based on the features extracted;

availing the set of functional limitations to the subject via an interaction interface, wherein the interaction interface includes one or more interactive components associated with a functional limitation of the set of functional limitations configured to receive one or more input signals that correspond to the functional limitation;

extracting a subset of functional limitations from the set of functional limitations based on the one or more input signals associated with the functional limitation of the set of functional limitations;

generating, based on the subset of functional limitations, dynamically adaptive datasets comprising a plurality of evaluation instances that are applicable to the input data by a second generative AI model of the one or more machine-learning techniques, wherein:

an evaluation instance of the plurality of evaluation instances includes a set of input parameters for the subject to choose from, and wherein the evaluation instance includes one or more quantifiable parameters to quantitatively assess the subset of functional limitations; and the dynamically adaptive datasets are configured to capture, for each evaluation instance, a prior state and a current state of the subject corresponding to the subset of functional limitations based on input signals received via the interaction interface; and generating, by leveraging an artificial intelligence (AI) engine, a structured output based on the dynamically adaptive datasets, wherein the structured output is generated by comparing the prior state and the current state to determine condition-specific changes associated with the subset of functional limitations.

17. The computer-program product of claim 16, further including:

availing, via the interaction interface, the dynamically adaptive datasets to the subject, wherein the interaction interface includes two sets of components associated with the set of input parameters, and wherein, for each evaluation instance of the plurality of evaluation instances, a first set of components of the two sets of components is configured to receive a first input signal that corresponds to the prior state of the subject and a second set of components of the two sets of components is configured to receive a second input signal that corresponds to the current state of the subject; and determining, for each evaluation instance of the plurality of evaluation instances, the first input signal and the second input signal by an AI engine.

18. The computer-program product of claim 16, wherein the structured output includes one or more outputs comprising:

a subject narrative description in a natural language format capturing self-reported details based on the input data and the subset of functional limitations;

a longitudinal record in the natural language format detailing the prior state of the subject and prior interventions or past experiences applicable to the condition;

one or more applicable influencing factors that currently are or will be impacting the current state of the subject at a predefined time by accessing historical records of the subject;

the prior state in the natural language format including a functional dataset with respect to the one or more quantifiable parameters before an onset of the condition;

the current state after the onset of the condition in the natural language format including the functional dataset with respect to the one or more quantifiable parameters to identify a change based on a comparison with the prior state; and one or more measurable objectives that are based on the subset of functional limitations, the prior state and the current state.

19. The computer-program product of claim 16, wherein the one or more machine-learning techniques are trained on a deidentified dataset that comprises transformed data associated with each subject of a plurality of subjects, generated by applying data de-identification to the input data, wherein the data de-identification is configured to replace identity information associated with each subject with synthetic data such that a subject remains anonymous, and wherein the data de-identification including:

extracting a set of data instances associated with the identity information from the input data;

classifying the set of data instances into one or more data instance types that are predefined;

generating a structured identifier to uniquely identify each data instance of the set of data instances with respect to an associated data instance value and a data instance type of the one or more data instance types;

generating the synthetic data by applying a third generative AI model of the one or more machine-learning techniques configured to replace the structured identifier associated with each data instance of the set of data instances with a synthetic value;

validating the synthetic data to verify whether the generated synthetic data complies with predefined usability and privacy criteria; and incorporating the synthetic data into the input data to generate the transformed data.

20. The computer-program product of claim 16, further comprising:

applying, for each generative AI model of the one or more generative AI models, one or more input guardrails to an input and one or more output guardrails to an output to validate that the input and the output of each generative AI model conforms to predetermined linguistic structures, safety protocols and regulations, wherein:

the application of the one or more input guardrails includes filtering out offensive or inappropriate language by applying a fuzzy matching technique;

the one or more input guardrails include verifying that the input to each generative AI model of the one or more machine-learning techniques is refined from an adversarial prompt that skew the output of each generative AI model from an intended task;

the one or more output guardrails include a prompted call to a large language model of the one or more machine-learning techniques to verify the output of each generative AI model is refined from a set of moderation categories, wherein the set of moderation categories includes at least one of child abuse, hate speech, malware, physical or economic harm, fraud, adult content, and/or unqualified law, health or financial advice.

* * * * *